United States Patent [19]
Yoshie et al.

[11] Patent Number: 5,582,748
[45] Date of Patent: Dec. 10, 1996

[54] METHOD OF MANUFACTURING OPTICAL FIBER CABLE COVERED WITH METAL PIPE, AND APPARATUS FOR MANUFACTURING THIS OPTICAL FIBER CABLE

[75] Inventors: Yasunori Yoshie; Takashi Kanazawa, both of Tokyo, Japan

[73] Assignee: NKK Corporation, Tokyo, Japan

[21] Appl. No.: 464,120

[22] Filed: Jun. 5, 1995

[30] Foreign Application Priority Data

Feb. 14, 1995 [JP] Japan ..................... 7-025208

[51] Int. Cl.⁶ ..................... B23K 26/02; B21D 39/00
[52] U.S. Cl. ..................... 219/121.64; 219/121.63; 219/121.82; 228/148
[58] Field of Search ..................... 219/121.63, 121.64, 219/121.82; 29/728; 228/175, 148; 350/96.23; 385/102, 107, 109

[56] References Cited

U.S. PATENT DOCUMENTS

| | | | |
|---|---|---|---|
| H631 | 5/1989 | Hamad et al. | 29/728 |
| 3,894,675 | 7/1975 | Klebl et al. | 228/130 |
| 4,477,147 | 10/1984 | Winter et al. | 350/96.23 |
| 4,504,112 | 3/1985 | Gould et al. | |
| 4,508,423 | 4/1985 | Winter et al. | 228/148 |
| 4,651,914 | 3/1987 | Sprung et al. | 228/17.5 |
| 4,651,917 | 3/1987 | Gould et al. | |
| 4,734,981 | 4/1988 | Ziemer | 228/17.5 |
| 4,759,487 | 7/1988 | Karlinski | |
| 4,852,790 | 8/1989 | Karlinski | |
| 5,054,679 | 10/1991 | Shotts et al. | 228/17.5 |
| 5,096,518 | 3/1992 | Fujikawa et al. | |
| 5,210,391 | 5/1993 | Yoshie et al. | 219/121.63 |
| 5,231,260 | 7/1993 | Yoshie et al. | |
| 5,241,153 | 8/1993 | Yoshie et al. | 219/121.64 |
| 5,380,977 | 1/1995 | Yoshie et al. | |
| 5,418,877 | 5/1995 | Oestreich | 385/102 |
| 5,426,277 | 6/1995 | Yoshie et al. | |

FOREIGN PATENT DOCUMENTS

| | | |
|---|---|---|
| 0703478A1 | 3/1996 | European Pat. Off. |
| 60-111211 | 6/1985 | Japan |
| 60-208011 | 10/1985 | Japan |
| 61-22315 | 1/1986 | Japan |
| 64-35514 | 2/1989 | Japan |
| 4-335306 | 11/1992 | Japan |
| 2154334 | 2/1984 | United Kingdom |

OTHER PUBLICATIONS

Patent Abstracts Of Japan, vol. 008, No. 141 (P–283) Jun. 30, 1984 & JP–A–59 040604 (Nipppon Denshin Denwa Kosho; Others; 01), Mar. 6, 1984.

Patent Abstracts Of Japan, vol. 95, No. 006 & JP–A–07 146425 (Sumitomo Electric Ind., Ltd.; Others 01), Jun. 6, 1995.

*Primary Examiner*—Teresa J. Walberg
*Assistant Examiner*—J. Pelham
*Attorney, Agent, or Firm*—Frishauf, Holtz, Goodman, Langer & Chick

[57] ABSTRACT

A method and apparatus for manufacturing a metal pipe-covered optical fiber cable perform extra length control of the metal pipe with respect to the optical fiber in accordance with length adjustment by reducing the diameter of the metal pipe while applying minimum tension or without applying any tension for extra length control to the optical fiber by means of a pair of rollers, so that a crack in the optical fiber is avoided and the service life of the optical fiber is prolonged.

14 Claims, 12 Drawing Sheets

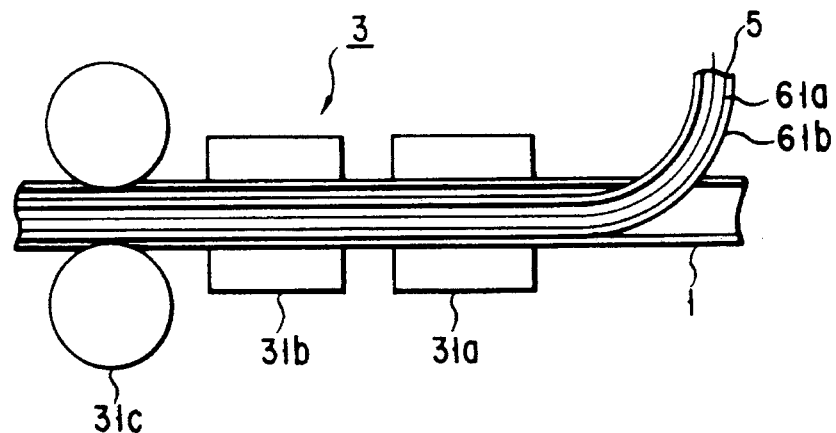
F I G. 18
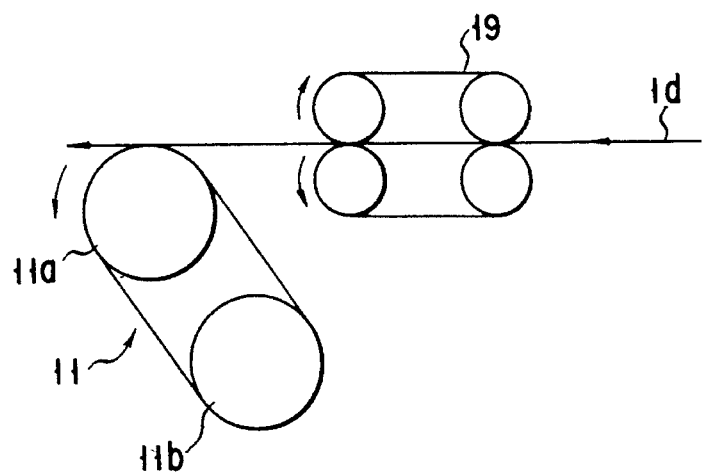
F I G. 19
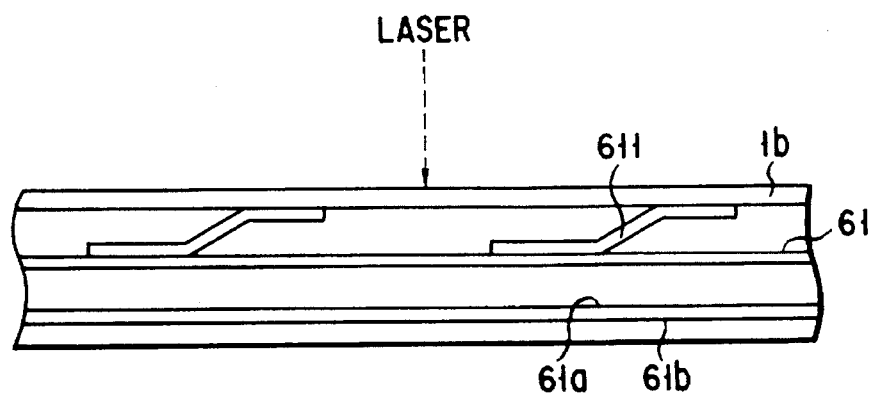
F I G. 20

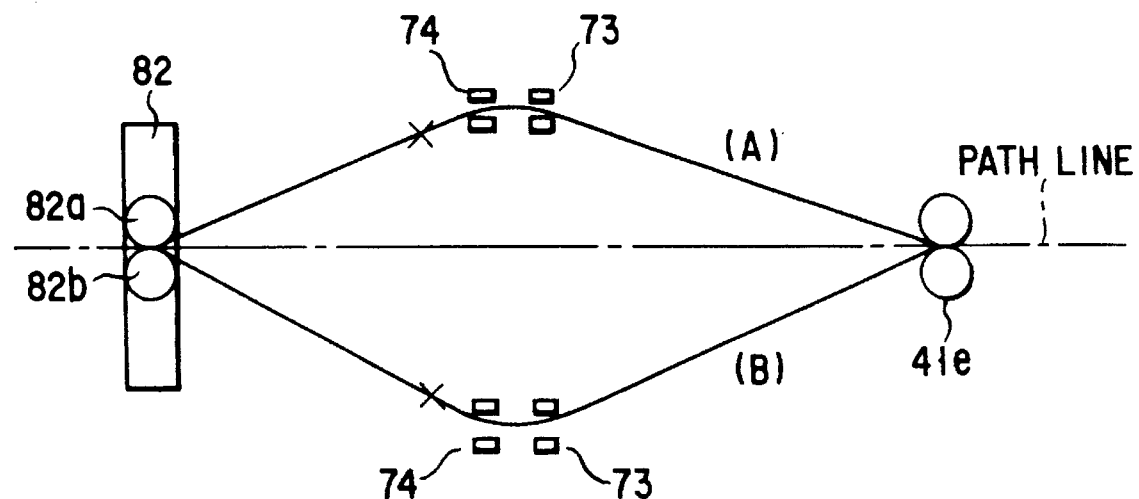
F I G. 23
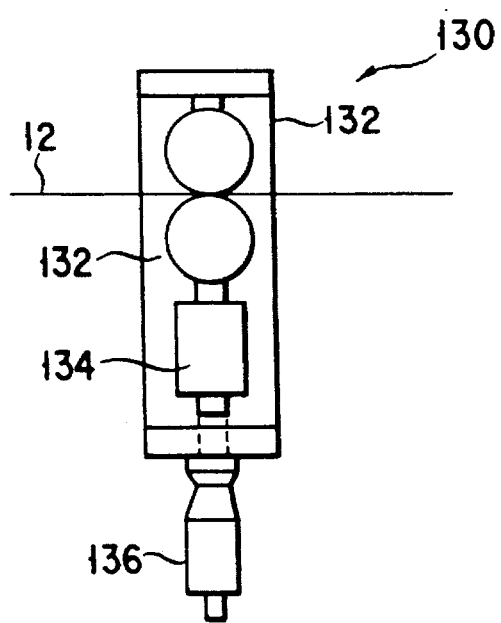
F I G. 24

METHOD OF MANUFACTURING OPTICAL FIBER CABLE COVERED WITH METAL PIPE, AND APPARATUS FOR MANUFACTURING THIS OPTICAL FIBER CABLE

BACKGROUND OF THE INVENTION

1. Field of the Invention

The present invention relates to a method of manufacturing an optical fiber cable covered with a metal pipe, and an apparatus for manufacturing this optical fiber cable.

2. Description of the Related Art

When a tension is applied to an optical fiber having a diameter of 250 μm, although a breaking strength is as rather large as about 6 kg, the elongation is 3 to 6%. This elongation is considerably small as compared to that of a conventional copper or aluminum cable. For this reason, a tensile strength member must be provided to the optical fiber to maintain a high optical fiber cable strength. When an optical fiber is dipped in water, its strength is sometimes degraded. Therefore, when laying an optical fiber cable underseas or underwater, an optical fiber cable having a sheath structure obtained by covering an optical fiber with a thin metal pipe must be employed to maintain a high laying tension and water resistance.

Conventionally, when such an optical fiber having a small diameter is to be covered with a metal pipe, the optical fiber is inserted in a metal pipe having a gap in the longitudinal direction, and this gap is welded by soldering. According to this method, however, heat generated during welding of the metal pipe is applied to the optical fiber through the gap for a comparatively long period of time, leading to thermal damage to the optical fiber.

Jpn. Pat. Appln. KOKAI Publication No. 64-35514 discloses an apparatus and method of continuously manufacturing an optical fiber covered with a metal pipe by welding the abutting portion of the metal pipe with a focused laser beam, so that thermal damage in the optical fiber is prevented. In this apparatus for manufacturing an optical fiber cable covered with a metal pipe, a flat metal strip which is continuously supplied is formed into a metal pipe having a longitudinal gap at its top portion. An introducing tube is inserted in the metal pipe through the gap in the metal pipe, and an optical fiber is inserted in the metal pipe through the introducing tube. After the gap of the metal pipe in which the optical fiber is introduced is closed, the metal pipe is supplied to a laser welding unit. The laser welding unit irradiates a laser beam having a focal point at a position outwardly remote from the surface of the abutting portion while positioning the abutting portion at the top portion of the supplied metal pipe with a guide roller, thereby welding the abutting portion. In this manner, welding of the abutting portion is realized by shifting the focal point of the laser beam from the abutting portion without protecting the optical fiber with a heat-shielding member. Subsequently, the outer diameter of the metal pipe incorporating the optical fiber is reduced to a predetermined size, and the metal pipe is wound on a capstan and continuously withdrawn from the capstan.

In withdrawal of the metal pipe, an inert gas is supplied to the introducing tube. The optical fiber is transported into the metal pipe with thee viscosity resistance of the inert gas. While the metal pipe is engaged with the capstan, the optical fiber is positioned on an outer side of the inner portion of the metal pipe by blowing the inert gas. Thus, when the metal pipe is set straight, the length of the optical fiber becomes larger than that of the metal pipe, so that the optical fiber flexes in the metal pipe, thereby preventing the optical fiber from causing a strain by the laying tension or the like.

Furthermore, when the metal pipe is damaged to form a hole, water can enter through the hole to degrade the optical fiber. In order to prevent this, a gel filler is injected into the metal pipe. More specifically, after the optical fiber is blown to the outer side within the metal pipe with the inert gas at the capstan, a filler is injected into the metal pipe through a filler introducing tube which is different from the introducing tube that introduces the optical fiber.

However, the conditions in which the fiber is used vary, and the optical fiber is used in various temperature conditions. The thermal expansion coefficient of the metal pipe as the sheath is greatly larger than that of the optical fiber. Hence, when the optical fiber is used in a high temperature, a tension is applied to the optical fiber due to a difference in elongation degree between the metal pipe and the optical fiber, thus causing damage to the optical fiber. A similar phenomenon also occurs when, e.g., a cable is laid underseas and thus placed with a large tension.

Inversely, when an optical cable is used at a low temperature, due to a difference in degree of shrinkage between the metal pipe and the optical fiber, the optical fiber is brought into contact with the inner wall of the metal pipe having a larger amount of shrinkage, and directly receives an edgewise pressure from the inner wall of the metal pipe, or irregular bents having small cycles are applied to the optical fiber, thus causing a so-called microbend loss. Then, the intensity of a signal transmitted through the optical fiber is attenuated.

In order to prevent these transmission loss and the like, conventionally, the optical fiber is blown to the outer side within the metal pipe while the metal pipe is engaged with the capstan, as described above, so that the length of the optical fiber becomes larger than that of the metal pipe when the metal pipe is set straight.

In this case, however, the difference in length between the optical fiber and the metal pipe (to be referred to as an extra length hereinafter) is determined by the outer diameter of the capstan and the difference between the inner diameter of the metal pipe and the outer diameter of the optical fiber. The extra length cannot thus be arbitrarily controlled, and a transmission loss can still occur in the optical fiber depending on the use conditions.

As described above, the optical fiber is blown to the outer side within the metal pipe with the inert gas while the metal pipe is engaged with the capstan, thereby imparting an extra length to the optical fiber. Therefore, when injecting a filler in the metal pipe, the filler must be injected while the optical fiber is blown to the outer side within the metal pipe. This is because of the following reason. Namely, if the filler is injected in advance and thereafter the inert gas is supplied, the filler serves as a resistance, and thus an extra length cannot be imparted to the optical fiber. Therefore, when injecting a filler, a filler introducing tube is required in addition to the introducing tube used for supplying the optical fiber and the inert gas. Since two introducing tubes must be separately inserted in the metal pipe, the inner diameter of the metal pipe must be large. Accordingly, the drawing amount required for drawing the metal pipe to reduce its diameter is increased. In some cases, the metal pipe cannot be drawn thin in accordance with the diameter of the optical fiber.

In view of the above situation, in order to solve the above problems, one of the present inventors proposes a method described in U.S. Pat. No. 5,231,260 and U.S. Ser. No. 08/078,394. According to the method disclosed in these official gazettes, the extra length can be arbitrarily controlled by adjusting the tension of the metal strip and the tension of the optical fiber. However, as an optical fiber is made of brittle glass, when excessive tension is applied to the optical fiber, a crack can be generated in the optical fiber. In other words, the service life of the optical fiber is shortened.

SUMMARY OF THE INVENTION

The present inventors studied a method of controlling an extra length of a metal pipe with respect to an optical fiber by adjusting the length of the metal pipe while avoiding application of a tension to the optical fiber for the purpose of extra length control, and completed the present invention.

It is an object of the present invention to provide a method and an apparatus for manufacturing an optical fiber cable covered with a metal pipe, in which the extra length of the metal pipe with respect to the optical fiber can be arbitrarily controlled by adjusting the length of the metal pipe.

It is another object of the present invention to provide a method and apparatus for manufacturing an optical fiber cable covered with a metal pipe, in which an excessive tension will be avoided to the optical fiber, so a crack will not be formed.

It is still another object of the present invention to provide a method and apparatus for manufacturing an optical fiber cable covered with a metal pipe, in which the optical fiber will not receive tension from the viscosity resistance of the filler.

According to the present invention, there is provided an apparatus for manufacturing an optical fiber cable covered with a metal pipe, comprising: forming means for forming a metal strip into a metal pipe by abutting two sides of the metal strip; welding means for forming a sealed metal pipe by welding the abutted two sides of the metal strip; optical fiber introducing means for introducing an optical fiber or an optical fiber bundle into the sealed metal pipe; means for reducing a diameter of the sealed metal pipe applied with a tension; traction means, arranged on a stage after the diameter reducing means, for pulling the metal pipe; and metal pipe length adjusting means, arranged on a stage after the traction means, for controlling an extra length of the optical fiber with respect to the metal pipe, by diameter-reducing the metal pipe free from the tension.

According to the present invention, there is also provided a method of manufacturing an optical fiber cable covered with a metal pipe, comprising: the forming step of forming a metal strip into a metal pipe by abutting two sides of the metal strip; the welding step of forming a sealed metal pipe by welding the two abutted sides of the metal strip; the optical fiber introducing step of introducing an optical fiber or an optical fiber bundle into the sealed metal pipe; the step of reducing a diameter of the metal pipe sealed in the welding step applied with a tension; the traction step of pulling the metal pipe on a stage after the diameter reducing step; and metal pipe length adjusting step of controlling an extra length of the optical fiber with respect to the metal pipe, by diameter-reducing the metal pipe free from the tension on a stage after the traction step.

When the filler is to be charged in the metal pipe, the optical fiber protecting means having a multiple tube structure consisting of at least an inner tube and an outer tube and extending to at least a position in the metal pipe to protect the optical fiber or the optical fiber bundle from welding is preferably arranged, the optical fiber or the optical fiber bundle is preferably introduced into the metal pipe through the inner tube of the optical fiber protecting means, and the filler is preferably charged in the metal pipe from the outer tube of the optical fiber protecting means through a welding position. In this case, it is also possible to charge an inert gas from the inner tube of the introducing tube into the metal pipe through the welding position.

Extra length control according to the present invention is mainly performed by length adjustment of the metal pipe. However, it is also possible to perform extra length control by employing length adjustment of the metal pipe and an operation of applying a tension to the optical fiber cable within a range not impairing the object of the present invention.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 18 is a partial view showing another arrangement of the optical fiber introducing means;

FIG. 19 is a partial view showing the arrangement of another embodiment;

FIG. 20 is an explanatory view of a plate spring mechanism;

FIG. 23 is an explanatory view showing the positioning state of the metal pipe at a welding position;

FIG. 24 is an enlarged view of a metal pipe length adjusting means; and

DETAILED DESCRIPTION OF THE PREFERRED EMBODIMENT

Figure 1:
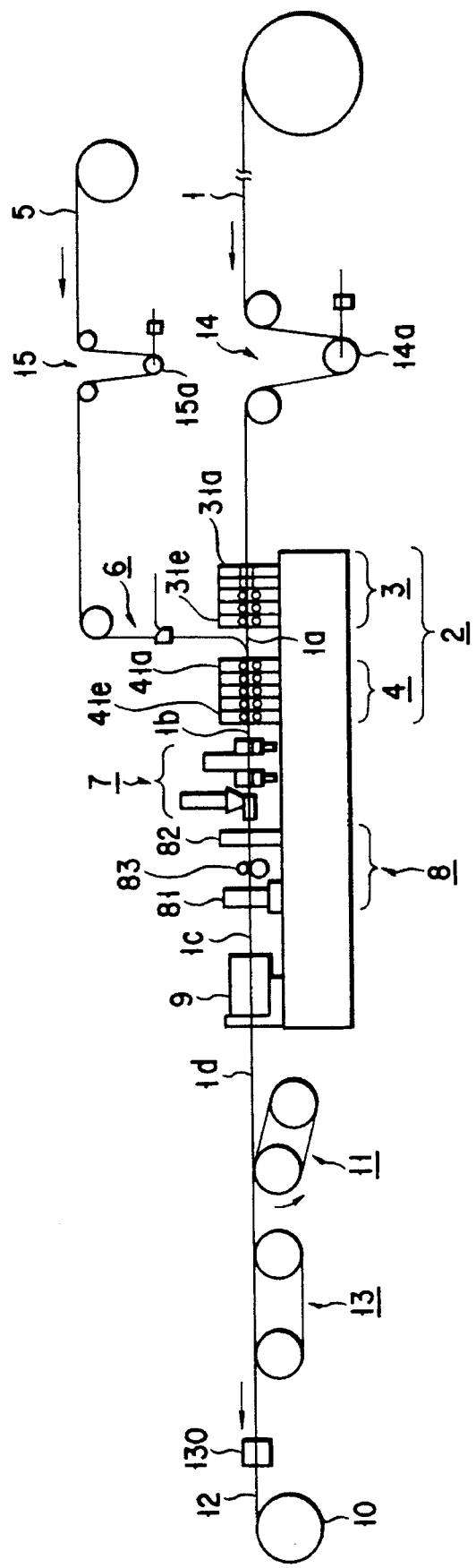
FIG. 1 is a view showing the entire arrangement of an embodiment of the present invention.

FIG. 1 shows the entire arrangement of an apparatus for manufacturing an optical fiber cable covered with a metal pipe according to an embodiment of the present invention. This apparatus has a tension adjusting means 14 for adjusting the tension of a metal strip 1. A forming means 2 for forming the metal strip 1 into a metal pipe by abutting the two sides of the metal strip 1 is provided on the output stage of the tension adjusting means 14. The forming means 2 has a first assembling body 3 and a second assembling body 4. This apparatus also has a tension adjusting means 15 for adjusting the tension of an optical fiber 5. An optical fiber introducing means 6 for introducing the optical fiber 5 into the formed metal pipe is provided, on the output stage of the tension adjusting means 15, between the first and second assembling bodies 3 and 4. A laser welding mechanism 7 is provided on the output stage of the forming means 2. A measuring section 8 and a diameter reducing means 9 are continuously provided on the output stage of the laser welding mechanism 7. A traction means is provided on the output stage of the diameter reducing means 9. The traction means has a tension changing means 11 and a tension adjusting means 13. A metal pipe length adjusting means 130 is provided on the output stage of the traction means. The metal pipe length adjusting means 130 adjusts the length of the metal pipe by reducing the diameter of the metal pipe. A cable take-up machine 10 is arranged on the output stage of the metal pipe length adjusting means 130.

The tension changing means 11, the tension adjusting means 13, the metal strip tension adjusting means 14, the optical fiber tension adjusting means 15, and the metal pipe length adjusting means 130 constitute an extra length control means for adjusting the length of the optical fiber relative to the metal pipe, i.e., for adjusting the extra length.

Figure 2A:
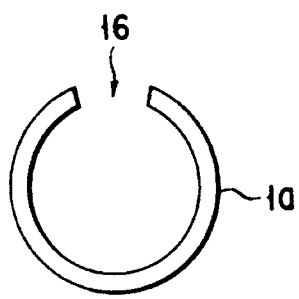
FIGS. 2A and 2B are sectional views respectively showing a metal pipe in a forming step.

The first assembling body 3 has a plurality of (e.g., five) forming roller pairs 31a to 31e that are continuously arranged in a row. The forming roller pairs 31a to 31e have different forming surfaces, and sequentially form the metal strip 1, which is continuously supplied, into a substantially U-shaped metal pipe 1a having a longitudinal gap 16 at its top portion, as shown in FIG. 2A.

Figure 2B:
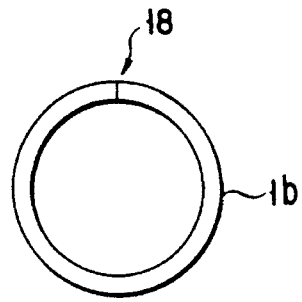
Figure 3A:
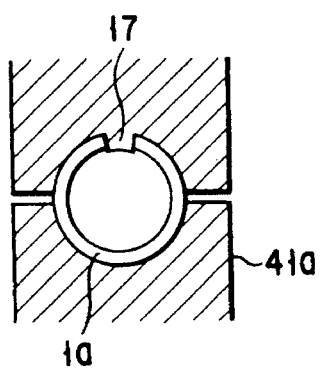
FIGS. 3A, 3B, and 3C are side views showing forming roller pairs of the second assembling body, respectively.
Figure 3B:
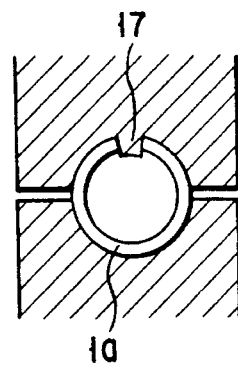
Figure 3C:
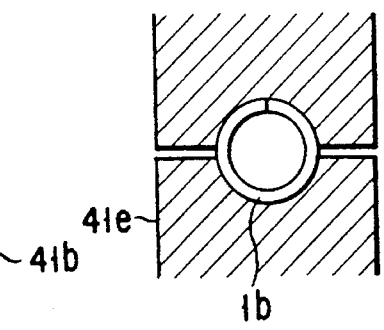

The second assembling body 4 similarly has a plurality of (e.g., five) forming roller pairs 41a to 41e that are continuously arranged in a row. The forming roller pairs 41a to 41e respectively have fins 17, as shown in FIGS. 3A to 3C. The widths of the fins 17 are sequentially decreased in the order from the forming roller pair 41a on a former stage to the forming roller pair 41e on a latter stage. The gap 16 of the metal pipe 1a is engaged with the fins 17, and the gap 16 is decreased while being positioned to locate at the vertex of the metal pipe 1a. The gap 16 is abutted by the forming roller pair 41e on the final stage, thereby forming a metal pipe 1b which is closed almost completely at its abutting portion 18, as shown in FIG. 2B.

Figure 4:
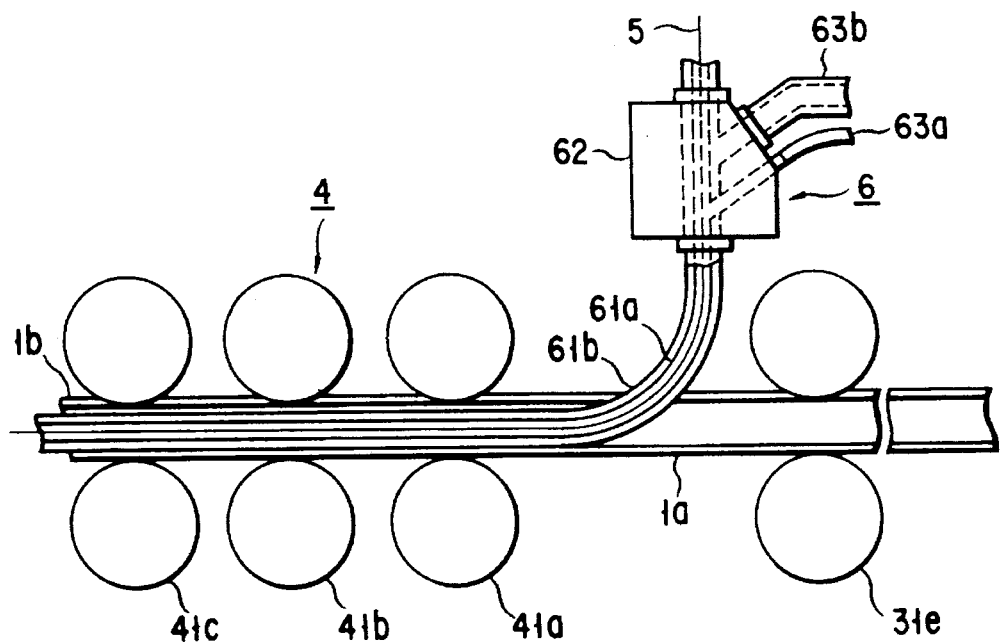
FIG. 4 is a view showing the arrangement of an optical fiber introducing means.

FIG. 4 shows a partial sectional view of the optical fiber introducing means 6. An introducing tube 61 is provided to the optical fiber introducing means 6. The introducing tube 61 serves as an optical fiber protecting means that guides the optical fiber 5 and introduces it into the metal pipe 1b. The proximal end of the introducing tube 61 is mounted to a tube connector 62. The introducing tube 61 extends through the metal pipe 1b, passes the welding position of the laser welding mechanism 7, and reaches a welded, sealed metal pipe 1c. The introducing tube 61 has a double tube structure consisting of an inner tube 61a and an outer tube 61b. The inner tube 61a guides the optical fiber 5 to the metal pipe 1b and is connected to an inert gas supply tube 63a in the tube connector 62. The outer tube 61b is connected to a filler supply tube 63b in the tube connector 62. Thus, a filler can be supplied from the filler supply tube 63b into the outer tube 61b, and an inert gas can be supplied from the inert gas supply tube 63a into the inner tube 61a. As the introducing tube 61 has the double tube structure, the introduction path for the optical fiber and the filler is divided into inner and outer tubes. Thus, even when the filler is charged at a high pressure, the filler will not leak from the loading port of the optical fiber, thus increasing the yield of the filler. When an excessive tension is applied to the optical fiber, a crack is formed in the optical fiber. However, in this embodiment, since a tension resulting from the influence of the viscosity of the filler is not applied to the optical fiber, the problem of cracking can be solved. More specifically, the viscosity of the filler is changed by a temperature change. This varies the rear tension of the fiber to change the extra length, causing variations in extra length rate. However, as the optical fiber introducing path and the filler introducing path are separated, this problem of variations in extra length rate can be solved.

The filler is called jelly, gel, a compound, or the like. A mineral oil or the like is used as the filler. The filler is charged as required into the metal pipe that covers the optical fiber, and has a waterstop function and an optical fiber positioning function. In the present invention, such a filler is also used as a cooling agent required in welding.

An inert gas is charged in the metal pipe that covers the optical fiber to purge hydrogen gas within the metal pipe. When the inert gas is flowed, the inert gas also serves as a cooling agent required in welding.

The introducing tube 61 in the present invention not only guides the optical fiber 5, but extends at least to the welding position, so that it serves as a protection pipe for protecting the optical fiber from being inversely affected by the welding heat. Accordingly, the introducing tube 61 is made of a metal having a high heat conductivity, e.g., copper or a copper alloy. The outer diameter of the introducing tube 61 is smaller than the inner diameter of the metal pipe 1b.

In this embodiment, the distal end of the introducing tube 61 passes the laser welding mechanism 7 and is located before a spiral flaw detector 81 of the measuring section 8. If the introducing tube 61 is passed to reach the spiral flaw detector 81, it can inversely influence the flow detection precision. The distal end of the introducing tube 61 is inserted to a portion before the spiral flaw detector 81 in order to prevent this. However, when the flaw detection result will not be inversely affected even if the introducing tube 61 is inserted to reach a portion to pass the spiral flaw detector 81, for example, when the metal pipe has a large diameter and the introducing tube 61 is in contact with the wall surface, on the opposite side to the flaw detecting position, within the metal pipe, the introducing tube 61 may be inserted such that its distal end exceeds the spiral flaw detector 81, e.g., to reach a portion before the diameter reducing means 9.

Figure 21:
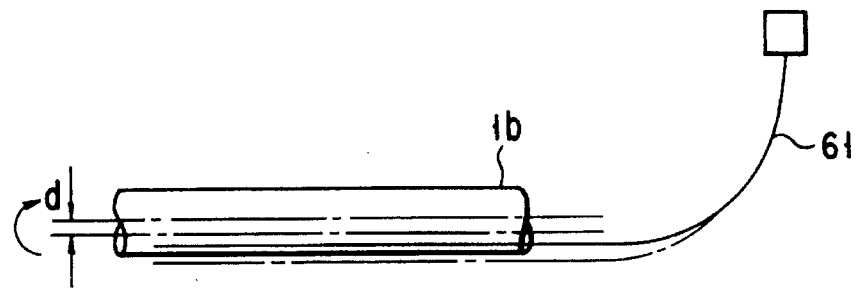
FIG. 21 is an explanatory view showing a state wherein the metal pipe is positioned upward.

As shown in FIG. 20, a plate spring mechanism 611 to face upward and brought into elastic contact with the inner wall surface of the metal pipe 1b may be provided to the introducing tube 61 before and/or after the laser beam irradiating position of the laser welding mechanism 7. Alternatively, as shown in FIG. 21, the metal pipe 1b may be arranged at an upper position before and/or after the laser irradiating position only by a predetermined distance, or downward elasticity may be imparted to the introducing tube 61 itself. Hence, the introducing tube 61 is brought into contact with the inner wall, on the opposite side to the laser beam irradiating position, within the metal pipe 1b.

Figure 22A:
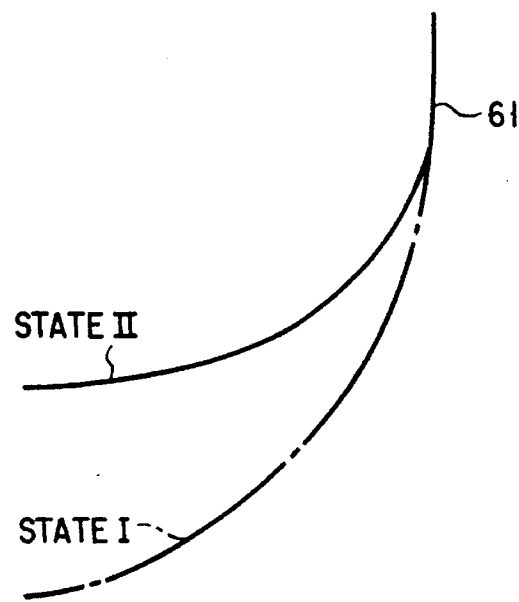
FIG. 22A is an explanatory view showing the bent states of an introducing tube.
Figure 22B:
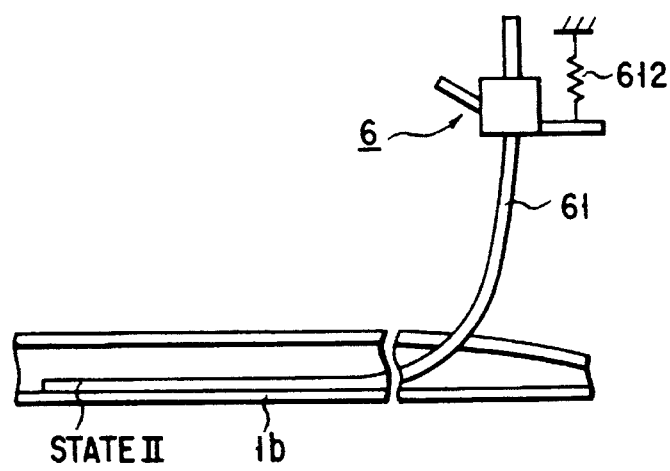
FIG. 22B is an explanatory view showing an introducing tube positioning mechanism.

Regarding the elastic pressure contact of the introducing tube 61 with the inner wall of the metal pipe 1b, it can be easily realized if the introducing tube 61 is bent from state I to state II by the elasticity of its own against its original nature to extend straight, as shown in FIG. 22A, and is brought into contact with the inner surface wall of the metal pipe 1b in state II and maintained at this bent state by fixing the optical fiber introducing means 6 at an appropriate position, as shown in FIG. 22B. At this time, a positioning mechanism 612 utilizing a spring mechanism or the like may be added to the optical fiber introducing means 6 as required.

When the metal pipe 1b is to be arranged at an upper position before the laser beam irradiating position by a predetermined distance, a positioning section 71 to be described later is finely adjusted. When the metal pipe 1b is to be arranged at an upper position after the laser beam irradiating position by a predetermined distance, a support roll stand 82 to be described later will be finely adjusted.

Figure 5:
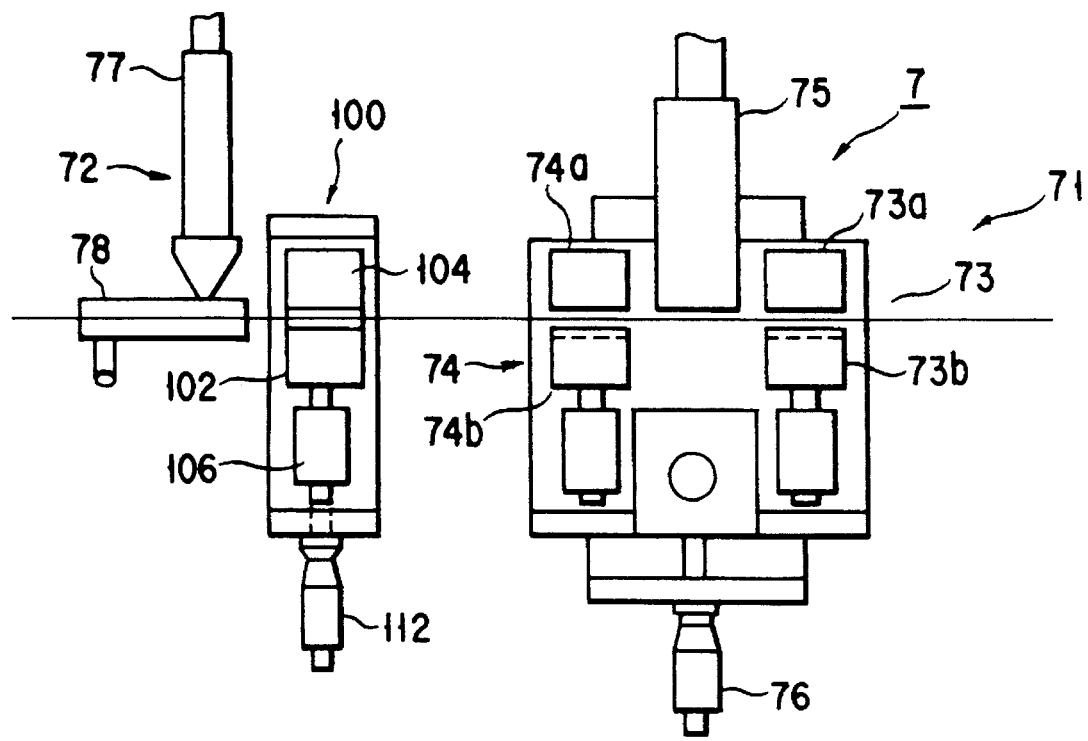
FIG. 5 is a view showing the arrangement of a laser welding means.

FIG. 5 shows the laser welding mechanism 7. The laser welding mechanism 7 has the positioning section 71 for positioning the metal pipe 1b, an opening width adjusting section 100 for adjusting the opening width of the abutting portion 18, and a laser welding section 72.

The positioning section 71 has, e.g., two sets of guide shoes 73 and 74, a CCD seam monitor 75 provided between the guide shoes 73 and 74, and a micrometer 76 for finely adjusting the positions of the guide shoes 73 and 74 in the vertical and horizontal directions.

Figures 6A, 6B:
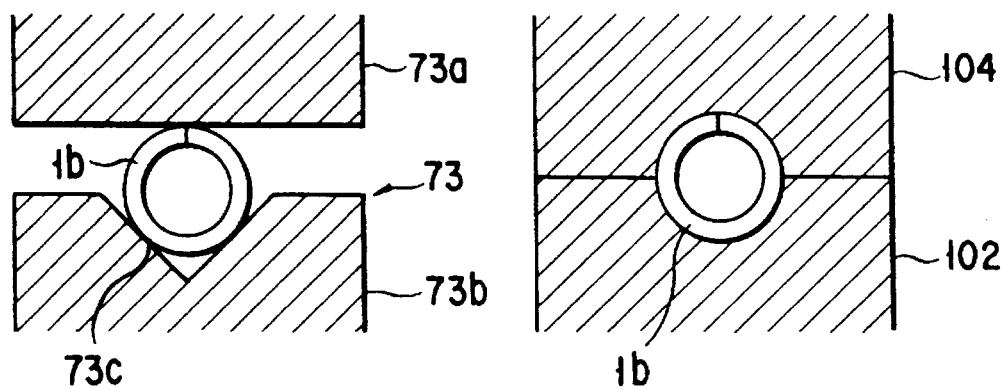
FIG. 6A is a sectional view showing guide shoes.
FIG. 6B is a sectional view showing squeeze shoes.

As shown in FIG. 6A, the guide shoe 73 (74) has an upper shoe 73a (74a) and a lower shoe 73b (74b). The upper shoe 73a (74a) has a flat surface to be brought into contact with the metal pipe 1b. The lower shoe 73b (74b) has, e.g., a V-shaped groove to engage with the metal pipe 1b, and is biased upward by a spring (not shown).

The opening width adjusting section 100 has, e.g., a set of upper and lower squeeze shoes 104 and 102, a spring 106 for urging the lower squeeze shoe 102 toward the metal pipe 1b, and a micrometer 112 for adjusting the urging force of the spring 106. The upper and lower squeeze shoes 104 and 102 respectively have semicircular portions along the outer circumferential surface of the metal pipe 1b, as shown in the sectional view of FIG. 6B. The width of the gap 16 is adjusted by adjusting the urging force of the spring 106 by the micrometer 112. When the gap 16 is adjusted by the squeeze shoe 104 arranged at 15 mm or less, especially 3 to 15 mm, from the welding portion, the laser weldability can be increased (this will be described later).

The positioning section 71 need not always be provided, and the opening width adjusting section 100 may also have a positioning function.

The laser welding section 72 has a laser irradiating means 77 and a gas seal means 78 for sealing the welding position of the metal pipe 1b with an inert gas, e.g., argon gas.

The laser irradiating means 77 is connected to, e.g., a carbon dioxide gas laser unit. The laser irradiating means 77 guides and focuses the laser beam through an optical system and irradiates the laser beam toward the surface of the metal pipe 1b at an angle of about 90°. The laser irradiating means 77 is adjusted such that the focal point of the laser beam is formed below the abutting portion 18 located at the top portion of the metal pipe 1b, i.e., inside the metal pipe 1b (see FIG. 8).

Referring back to FIG. 1, the measuring section 8 provided on the output stage of the laser welding mechanism 72 has the support roll stand 82, a speedometer 83, and the spiral flaw detector 81, and examines the welded state and the like.

The diameter reducing means 9 comprises roller dies and reduces the outer diameter of the welded, sealed metal pipe 1c to a predetermined value, thereby forming the metal pipe 1c into a thin metal pipe 1d in accordance with the outer diameter of the optical fiber 5. A tension is applied to the metal pipe, which is to be diameter-reduced by the diameter reducing means 9, mainly by the forming means 2 and the diameter reducing means 9.

Figure 7A:
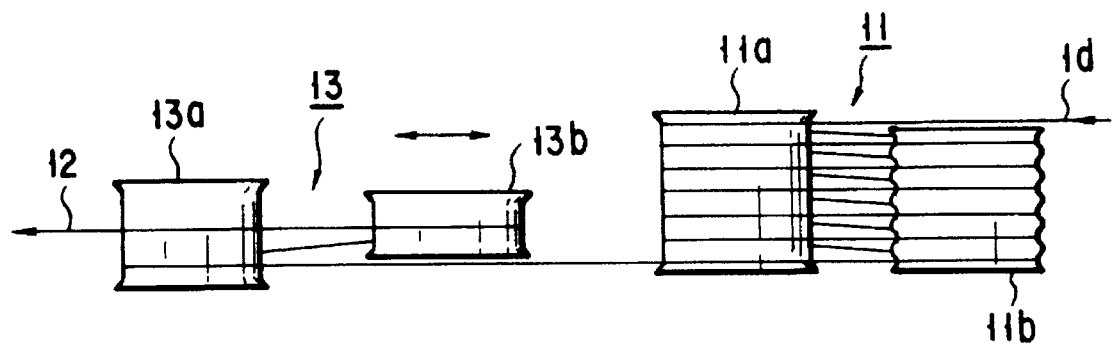
FIG. 7A is a front view showing a tension changing means and a tension adjusting means.
Figure 7B:
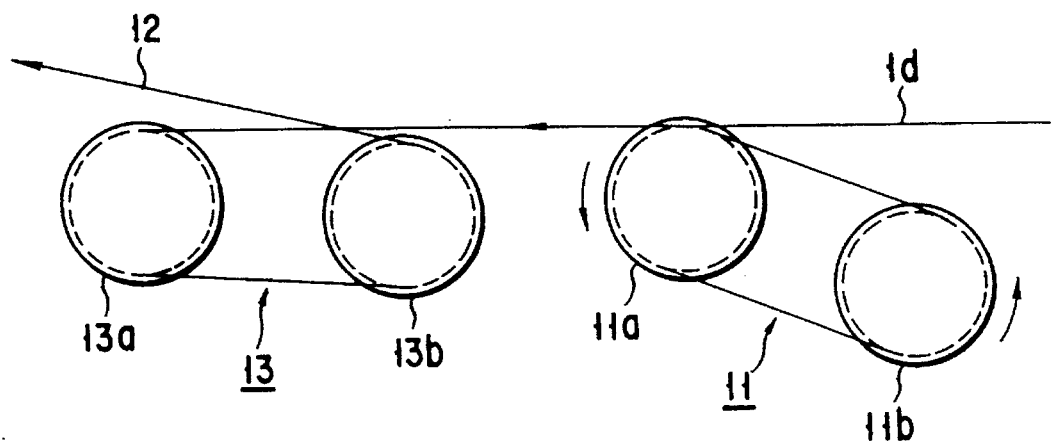
FIG. 7B is a plan view of the same.

The tension changing means 11 provided on the output side of the diameter reducing means 9 comprises capstans having, e.g., a pair of rolls 11a and 11b, as shown in FIGS. 7A and 7B. The surface of one roll 11a is formed smooth. A plurality of grooves are formed in the surface of the other roll 11b, and the metal pipe 1d is wound on the roll 11b by a plurality of turns without overlapping. The tension adjusting means 13 also comprises dancer roll stands having a pair of rolls 13a and 13b. When the distance between the rolls 13a and 13b is changed by moving the position of one roll 13b in the direction indicated by an arrow, the tension of the metal pipe-covered optical fiber cable 12 on the output side of the capstan 11 is adjusted.

Referring back to FIG. 1, the tension adjusting means 14 and 15 for adjusting the tension of the metal strip 1 supplied to the forming means 2 and the tension of the optical fiber 5 supplied to the optical fiber introducing port of the introducing tube 61 respectively comprise dancer stands. The dancer stands 14 and 15 change tensions by moving dead weights acting on pulleys 14a and 15a engaging with the metal strip 1 and the optical fiber 5, respectively.

As shown in FIG. 24, the metal pipe length adjusting means 130 arranged between the cable take-up machine 10 and the tension adjusting means 13 has dies 132 through which the metal pipe 1d extends, an urging means 134 for urging the dies 132 against the metal pipe 1d, and an urging force adjusting means 136, e.g., a micrometer, for adjusting the urging force of the urging means 134. The metal pipe length adjusting means 130 extends the metal pipe 1d, from which the tension is removed by the traction means, for a predetermined length by reducing its diameter, thereby adjusting the length of the optical fiber with respect to the metal pipe, i.e., adjusting the extra length. When the metal pipe is diameter-reduced by the metal pipe length adjusting means 130, the extra length is adjusted without substantially applying any tension or excessive tension to the optical fiber, so that damage to the optical fiber is prevented, thereby prolonging the service life of the optical fiber. The metal pipe-covered optical fiber cable 12 whose extra length is controlled is taken up by the take-up machine 10.

An operation of manufacturing the metal pipe-covered optical fiber cable 12 by the manufacturing apparatus having the above arrangement will be described in accordance with manufacturing steps.

The outline of the manufacturing operation will be described. As shown in FIG. 1, the metal strip 1 adjusted to a predetermined tension is continuously supplied to the forming means 2 and formed into the metal pipe 1a (forming step). The optical fiber 5 adjusted to the predetermined tension is continuously supplied into the metal pipe 1a (optical fiber inserting step). The metal pipe 1b in which the optical fiber 5 is mounted is laser-welded by the laser welding means 72 to seal its opening 18a (laser welding step). The sealed metal pipe 1c is subjected to predetermined measuring and inspection, and its diameter is reduced to a predetermined value by the diameter reducing means 9 (measuring and diameter reducing step). The diameter-reduced metal pipe 1d is pulled by the tension changing means 11 and the tension adjusting means 13 (traction step). The metal pipe 1d output from the tension adjusting means 13 and from which the tension is removed passes through the metal pipe length adjusting means 130 so that its diameter is reduced, thereby performing extra length control (extra length control step). The metal pipe-covered optical fiber cable 12 obtained by extra length control is taken up by the cable take-up machine 10 (take-up step). Each step will be described later in detail.

(1) Forming Step

As shown in FIG. 1, the metal strip 1 is continuously supplied to the forming means 2 while it is adjusted to a predetermined tension by the dancer stand 14. The first assembling body 3 forms the metal strip 1 supplied thereto into the metal pipe 1a. The formed metal pipe 1a has the longitudinal gap 16 at its top portion. When this metal pipe 1a is sent to the second assembling body 4, as shown in FIGS. 3A to 3C, the gap 16 of the metal pipe 1a is sequentially narrowed in accordance with the widths of the fins 17 of the forming roller pairs 41a to 41d of the second assembling body 4. The gap 16 is abutted by the forming roller pair 41e on the last stage, thereby forming the metal pipe 1b which is completely closed at the abutting portion 18. Note that after passing the last forming roller pair 41e, the abutting portion 18 is opened due to spring back of the metal pipe 1b.

(2) Optical Fiber Inserting Step

The optical fiber 5 adjusted to the predetermined tension by the dancer stand 15 is continuously supplied between the first and second assembling bodies 3 and 4 from the introducing tube 61 inserted through the gap 16 in the metal pipe 1a. In FIG. 4, when the optical fiber is supplied, the filler is supplied from the tube 63b into the outer tube 61b, and an inert gas, e.g., argon gas, helium gas, nitrogen gas, or the like is supplied from the tube 63a into the inner tube 61a.

(3) Laser Welding Step

The metal pipe 1b inserted in the introducing tube 61 is sent to the positioning section 71. The metal pipe 1b sent to the positioning section 71 is guided as it is engaged with the grooves in the guide shoes 73 and 74. Accordingly, transverse shift, rotation, and furthermore meandering of the metal pipe 1b can be prevented. Positional displacement of the abutting portion 18 was observed by the CCD seam monitor 75. When guide rollers were used, the abutting portion 18 shifted for as large as ±100 μm by torsion. In contrast to this, when the guide shoes were used, the abutting portion 18 shifted as small as ±15 μm.

Subsequently, the CCD seam monitor 75 detects the position of the abutting portion 18 of the metal pipe 1b. The position of the micrometer 76 is detected from the detection result of the abutting portion 18. The micrometer 76 is automatically or manually operated in accordance with the detection result to move the guide shoes 73 and 74. Fine adjustment is performed such that the abutting portion 18 is set at a predetermined position with respect to the focal point of the laser beam.

The role of the positioning section 71 will be described in detail. As described previously, the guide shoes 73 and 74 of the positioning section 71 prevent rotation or meandering of the metal pipe 1b, and guide the abutting portion 18, precisely located with respect to the laser irradiating position by the finned forming roller pairs 41a to 41d, to the laser irradiating position without causing the metal pipe 1b to wind. As described previously, the metal pipe 1b can be arranged at an upper portion before the laser beam irradiating position by a predetermined distance by adjusting the positioning section 71. As a result, the introducing tube 61 can be firmly brought into elastic contact with the inner wall surface of the metal pipe 1b. Thus, the adverse influence of laser welding can be minimized, as described above, and a long-term continuous manufacturing operation can be performed.

As shown in FIG. 23, the metal pipe 1b is arranged above or below a path line by a predetermined distance or more (but within the range of the elastic limit) by the positioning section 71 by using support rolls 82a and 82b of the support roll stand 82 and the last forming roller pair 41e as two fulcrums, so that the metal pipe 1b constitutes two sides of a substantial triangle. At this time, a light tension is applied to the metal pipe 1b located between the support roll stand 82 and the last forming roller pair 41e. This means that the positioning section 71 serves as a means for adjusting the tension of the metal pipes (especially the metal pipes 1c and 1d) just like the metal strip tension adjusting means 14 to be described later. This suppresses vibration of the metal pipe 1b at the laser welding position (indicated by a mark X in FIG. 23).

At the laser irradiating position, another CCD monitor (not shown) was actually installed at a position inclined by 90° from the CCD seam monitor 75 and the path line as the center, and vertical vibration of the metal pipe 1b was observed. As a result, the following facts were confirmed. When the guide shoes 73 and 74 of the positioning section 71 were open, the metal pipe 1b vibrated by about ±100 to ±150 μm. When the metal pipe 1b was fixed by the guide shoes 73 and 74, the metal pipe 1b vibrated by about ±20 to ±30 μm. When the positioning section 71 was adjusted as shown in FIG. 23A or 23B, the metal pipe 1b vibrated by about ±5 μm.

When elastic contact of the introducing tube 61 with the inner wall surface of the metal pipe 1b is considered, it is preferable to adjust the positioning section 71 as in FIG. 23A rather than as in FIG. 23B. By this adjustment, high-degree welding control is enabled, and the adverse influence of welding is further decreased, thus contributing to a long-term operation.

Figure 25:
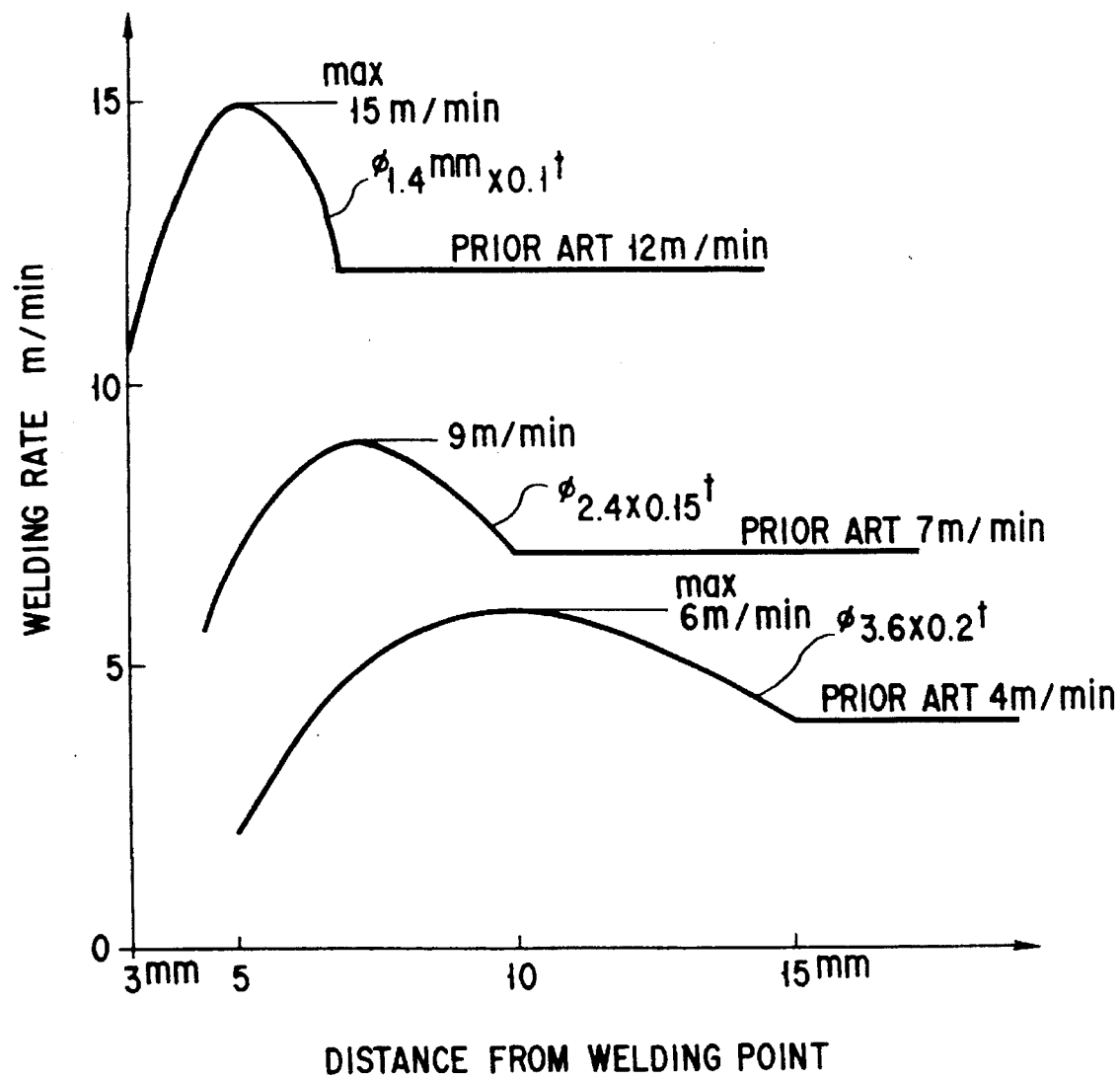
FIG. 25 is a graph showing the relationship between the distance, that influences the weldability, of the squeeze shoe from the welding position and the welding rate.

The metal pipe 1b, the position of the abutting portion 18 of which is adjusted in this manner, is supplied to the opening width adjusting section 100. More specifically, the abutting portion 18 is opened due to spring back of the metal pipe 1b. The width of the opening 18a largely influences weldability as well as the welding rate, the laser power, and the focus shift amount of the laser beam. Thus, the opening width is adjusted by the opening width adjusting section 100. The opening width is determined by the urging force of the urging means (micrometer) 112 and the distance of the squeeze shoes 102 and 104 from the welding position. When the plate thickness is large, the optimum opening width of the welding portion is larger than that obtained when the plate thickness is small. Therefore, when the plate thickness of the metal pipe is small, that is, when a large opening width is set, the urging force of the micrometer 112 is set to be comparatively small, and/or the distance of the squeeze shoes 102 and 104 from the welding position is set to be comparatively large. Inversely, when the plate thickness is small, that is, when a small opening width is set, the urging force of the micrometer 112 is increased, and/or the distance of the squeeze shoes 102 and 104 from the welding position is decreased. Generally, the squeeze shoes 102 and 104 are preferably provided at 15 mm or less from the welding position. When the distance from the welding position exceeds 15 mm, the width of the opening 18a is increased at the welding position due to spring back of the metal pipe 1b, making it difficult to adjust the width of the opening 18a to a desired value. The squeeze shoes 102 and 104 must be provided at 3 mm from the welding position at the nearest. If the distance from the welding position becomes less than 3 mm, the squeeze shoes 102 and 104 will be thermally influenced by the laser beam. FIG. 25 shows the influence of the distance from the welding position on the weldability. In FIG. 25, the distance of the squeeze shoes 102 and 104 from the welding position is plotted along the axis of abscissa (unit: mm), and the welding rate (unit: m/min) is plotted along the axis of ordinate, while other welding conditions are set the same. From FIG. 25, the following facts are obtained. With a metal pipe of 1.4 mm$\phi$×0.1t, the maximum welding rate of 15 m/min can be obtained when the distance of the squeeze shoes 102 and 104 from the welding position is 5 mm in the range of 3 to 7 mm, which is larger than the conventional welding rate (12 m/min) obtained under the same conditions. With a metal pipe of 2.4 mm$\phi$×0.15t, the maximum welding rate of 9 m/min can be obtained when the distance of the squeeze shoes 102 and 104 from the welding position is 7 mm in the range of 4.5 to 10 mm, which is larger than the conventional welding rate (7 m/min) obtained under the same conditions. With a metal pipe of 3.6 mm$\phi$× 0.2t, the maximum welding rate of 6 m/min can be obtained when the distance of the squeeze shoes 102 and 104 from the welding position is 10 mm in the range of 5 to 15 mm, which is larger than the conventional welding rate (4 m/min) obtained under the same conditions. The opening width is usually adjusted within the range of 0 to 150 μm, although it depends on other welding conditions as well.

The metal pipe 1b, the opening width of the opening 18a of which is adjusted by the opening width adjusting section 100, is fed to the laser welding means 72. In the laser welding means 72, a laser beam is irradiated from the laser irradiating means 77 while argon gas is supplied from the gas seal means 78 to the opening 18a of the metal pipe 1b, thereby welding the opening 18a. The inner surface of the welding section is sealed by the argon gas which flows in the introducing tube 61 and is injected from the distal end of the introducing tube 61 to flow back. An increase in temperature of the optical fiber 5 is minimized by cooling the optical fiber 5 with the argon gas flowing in the introducing tube 61 and flowing back from the distal end of the introducing tube 61. After this, the argon gas is charged in the metal cover pipe to purse hydrogen gas that adversely influences the optical fiber.

The introducing tube 61 that guides the optical fiber 5 is disposed such that it is brought into elastic contact with the inner wall, on the opposite side to the laser beam irradiating position, of the metal pipe 1b before and after the laser beam irradiating position, and a gap is provided between the inner surface of the opening 18a and the introducing tube 61. Thus, heat shielding is performed by this gap and the introducing tube 61, thereby decreasing the influence of heat on the optical fiber 5.

When the introducing tube 61 is to be arranged on the opposite side to the opening of the metal pipe in the laser welding section 72, if the positioning section 71 is adjusted to locate the metal pipe 1b above the path line, the arrangement of the introducing tube 61 described above can be realized more elastically.

When the introducing tube 61 and the optical fiber 5 are cooled by the filler flowing in the introducing tube 61, an increase in temperature of the introducing tube 61 and the optical fiber 5 can be minimized. As a result, the service life of the introducing tube 61 can be prolonged, so that an elongated metal pipe-covered optical fiber can be manufactured, and quality degradation of the optical fiber caused by the influence of the laser heat is prevented. After this, the filler is charged in the metal cover pipe, so that water will not enter the metal pipe-covered optical fiber and the metal pipe-covered optical fiber will be positioned by the filler.

For example, the temperature near the optical fiber 5, which is conventionally increased to 600° C. or more when the introducing tube 61 is in contact with the opening 18a at the laser irradiating position, can be decreased to about 115° C. to 135° C. by providing the above gap, and can be decreased to about 100° C. by flowing the filler.

The adverse influence of spatter, deposited on the introducing tube 61, on welding can be delayed by providing the above gap, so that stable welding can be performed for a long period of time.

The laser beam irradiated by the laser irradiating means 77 is adjusted to form its focal point inside the metal pipe 1b. Thus, the power intensity of the laser beam irradiated toward the opening 18a can be prevented from excessively increasing, thereby allowing stable welding.

As the focal point of the laser beam is formed inside the metal pipe 1b, once the cavity is formed, the laser beam which is reflected by the cavity wall is focused toward the bottom portion of the cavity, so that a deep cavity is formed. Thus, the melting width can be set almost constant, and the rear bead width can be narrowed.

When the focal shift amount of the laser beam which is irradiated at a constant power is set within a predetermined range, thus controlling the irradiation power intensity, and the welding rate is determined in accordance with the focal shift amount, e.g., the irradiation power intensity, the rear bead width is decreased, thereby suppressing the adverse influence of spatter.

Since no non-welding portion remains at the opening 18a, a minimum value $b_{min}$ of the rear bead width is fixed, and a maximum value $b_{max}$ of the rear bead width is fixed at a limit where no adverse influence of spatter occurs even after a long-term operation.

Figure 8:
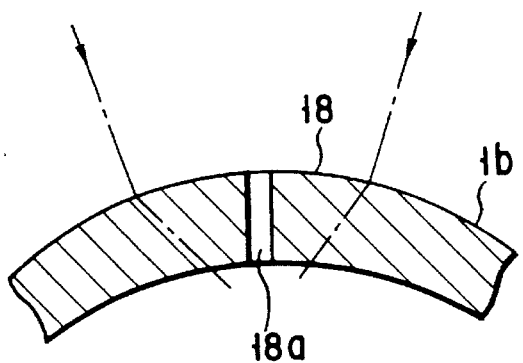
FIG. 8 is an explanatory view showing the abutting portion of a metal pipe.
Figure 9:
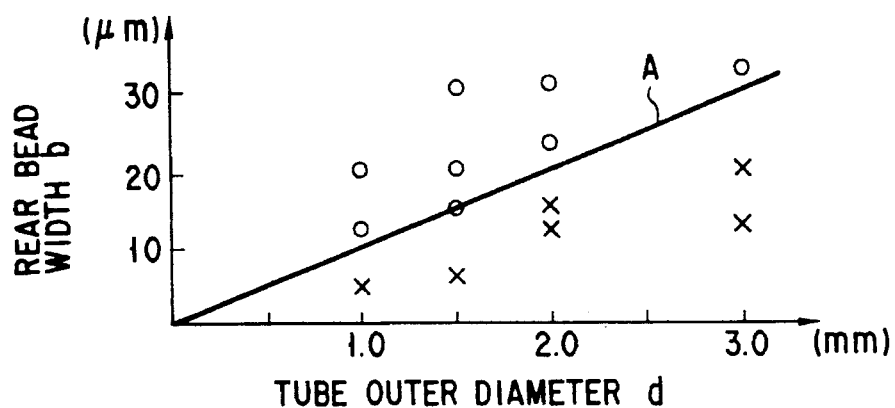
FIG. 9 is a graph showing the relationship between the tube outer diameter and the rear bead width.

As has been described previously, in the abutting portion 18 of the metal pipe 1b, the opening 18a is formed at the position of the laser welding section 72 due to spring back of the metal pipe 1b, as shown in FIG. 8. Spring back that causes this opening 18a is influenced by the rigidity of the metal pipe 1b, i.e., by an outer diameter d of the formed metal pipe 1b. FIG. 9 shows a result obtained by examining the relationship between the outer diameter d (mm) and the rear bead width b (μm) by irradiating a laser beam having a power of 400 (W) to the opening 18a to perform welding while the metal pipe 1b made of Fe-based stainless steel and having a longitudinal modulus of 18,000 (kg/mm$^2$) is completely fixed. The tube outer diameter d is plotted along the axis of abscissa, and the rear bead width b is plotted along the axis of ordinate. In FIG. 9, o indicates a case wherein a non-welded portion does not occur, and x indicates a case wherein a non-welded portion occurs. Accordingly, a straight line A indicates a limit where a non-welded portion does not occur. The straight line A is b=10d.

In an actual apparatus, it was obvious from observation using the CCD seam monitor 75 that a relative shift of about ±5 μm occurred between the laser beam and the opening 18a due to small vibration of the apparatus and the like.

Thus, the minimum width $b_{min}$ of the rear bead becomes 10d±5 μm. For example, when the outer diameter of the metal pipe 1b is 1 mm, the minimum width $b_{min}$ of the rear bead is 20 μm.

In the above description, the minimum width of the rear bead $b_{min}$=10d±5 μm is obtained when the metal pipe 1b is made of Fe-based stainless steel having a longitudinal modulus of 18,000 (kg/mm$^2$). Even if Fe-based stainless steel or an Ni-based alloy having a longitudinal modulus of 18,000 (kg/mm$^2$) or more is used, high-quality welding not causing a non-welded portion can be performed by increasing the rear bead width to be larger than the minimum width $b_{min}$.

Figure 10:
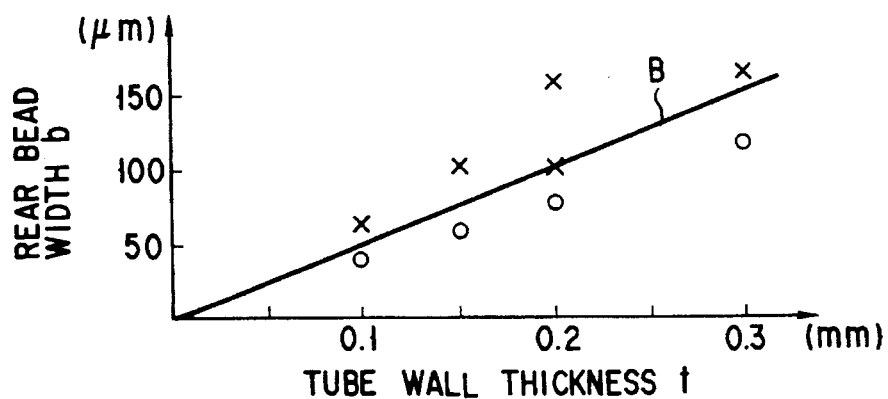
FIG. 10 is a graph showing the relationship between the tube wall thickness and the rear bead width.

The limit where no adverse influence of spatter occurs even after a long-term operation is determined by the shape of the melt zone. FIG. 10 shows a result obtained by examining the relationship between the tube wall thickness t (mm) and the rear bead width b (μm) by irradiating a laser having a power of 400 (W) to the opening 18a to perform welding. The tube wall thickness t is plotted along the axis of abscissa, and the rear bead width b is plotted along the axis of ordinate. In FIG. 10, o indicates a case wherein no adverse influence of spatter occurs and welding can be continuously performed for a long period of time, e.g., for 10 hours, and x indicates a case wherein spatter occurs and long-term welding cannot be performed. Note that ten hours described above correspond to the maintenance timing of the actual operation and do not specify the limit time where no adverse influence of spatter occurs.

Accordingly, a straight line B indicates a limit where no adverse influence of spatter occurs even after a long-term operation. The straight line B is b=1000(t/2). Thus, when the tube wall thickness t is 0.1 mm, the allowable maximum rear bead width $b_{min}$ is 50 μm.

In this manner, when a laser beam having a power of 400 (W) is used and the metal pipe 1b has a wall thickness of 0.1 mm and an outer diameter of 1 mm, if welding is performed by controlling the rear bead width b to 20 to 50 μm, an adverse influence of spatter is suppressed even after a long-term operation, thereby continuously performing welding free from defects.

In order to set the rear bead width b within a predetermined range in this manner, the focal shift of the laser beam irradiated toward the abutting portion 18 must be performed in accordance with the size of the metal pipe 1b, thereby controlling the irradiation power intensity.

The welding rate is determined by the condensing diameter of the laser beam, i.e., the focal shift amount, and the overlap ratio.

Figure 11:
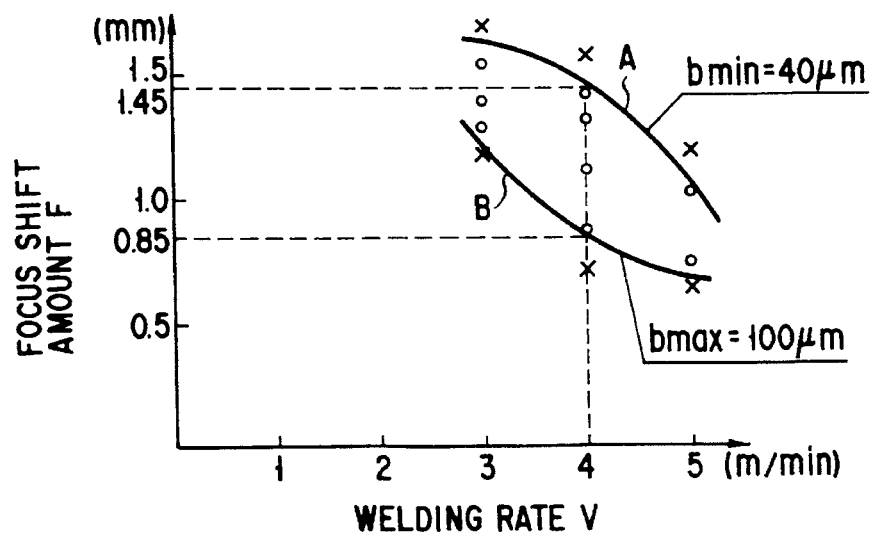
FIG. 11 is a graph showing the relationship between the welding rate and the focus shift amount.
Figure 12:
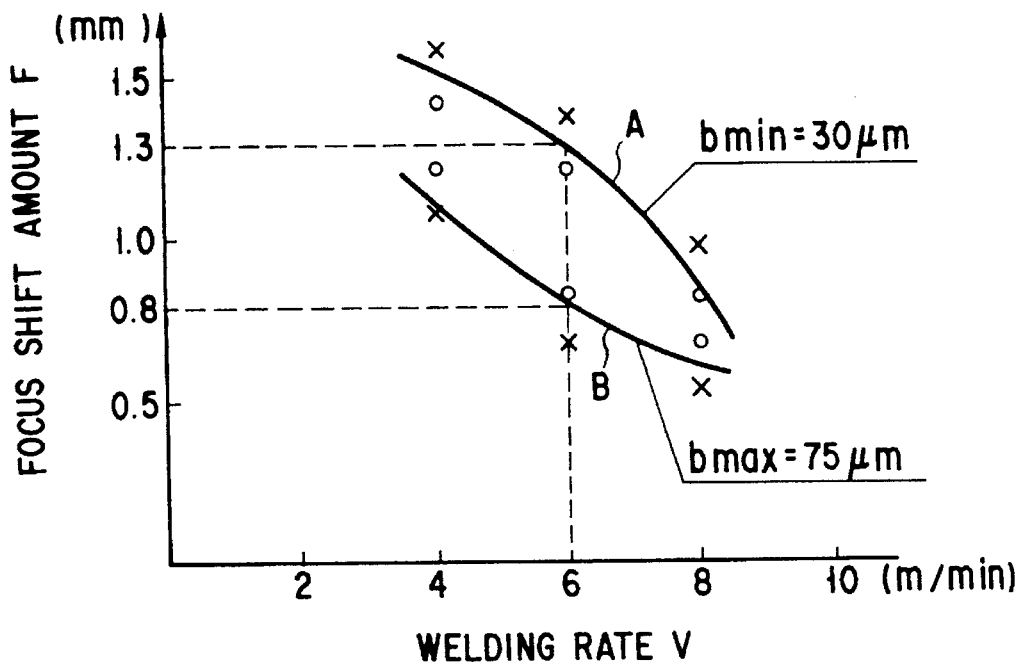
FIG. 12 is a graph showing the relationship between the welding rate and the focus shift amount.
Figure 13:
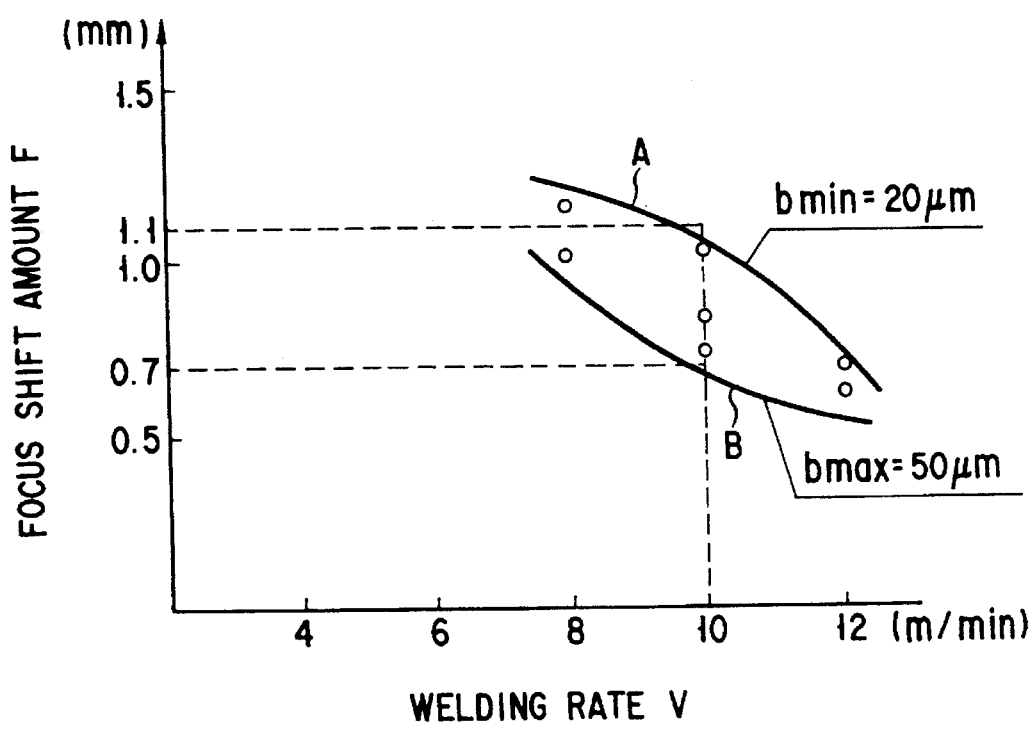
FIG. 13 is a graph showing the relationship between the welding rate and the focus shift amount.

FIGS. 11, 12, and 13 show the results obtained by examining cases satisfying the condition of minimum value $b_{min}$≧10d±5 μm and the condition of maximum rear bead width $b_{max}$≦1000(t/2) and cases not satisfying these conditions, while changing the size of the metal pipe 1b. In FIGS. 11, 12, and 13, the welding rate V (m/min) is plotted along the axis of abscissa, and the focus shift amount F (mm) is plotted along the axis of ordinate. FIGS. 11 to 13 respectively show a case wherein the outer diameter d and the tube wall thickness t of the metal pipe 1b are 3.5 mm and 0.2 mm, respectively, a case wherein the outer diameter d and the tube wall thickness t of the metal pipe 1b are 2.0 mm and 0.15 mm, respectively, and a case wherein the outer diameter d and the tube wall thickness t of the metal pipe 1b are 1.0 mm and 0.1 mm, respectively. In FIGS. 11 to 13, o indicates a case wherein these conditions are satisfied, and x indicates a case wherein these conditions are not satisfied. The limits where these conditions are satisfied and not satisfied are indicated by curves A and B. The curve A indicates the minimum appropriate rear bead width $b_{min}$=10d±5 μm, and the curve B indicates the maximum appropriate rear bead width $b_{max}$=1000(t/2).

As shown in FIG. 11, when the outer diameter d and the tube wall thickness t of the metal pipe 1b are 3.5 mm and 0.2 mm, respectively, the allowance is the largest when the focus shift amount F falls within an appropriate range of F=0.85 mm to F=1.45 mm. Hence, when welding is performed by setting the focus shift amount within this range and the welding rate V to 4 (m/min), welding can be performed for a long period of time without being influenced by spatter while suppressing the rear bead width b within a predetermined range of 40 to 400 μm.

Similarly, when the outer diameter d and the tube wall thickness t of the metal pipe 1b are 2.0 mm and 0.15 mm, respectively, welding may be performed by setting the focus shift amount F within the range of 0.8 to 1.3 mm and the welding rate V to 6 (m/min). When the outer diameter d and the tube wall thickness t of the metal pipe 1b are 1.0 mm and 0.1 mm, respectively, welding may be performed by setting the focus shift amount F to 0.7 to 1.1 mm and the welding rate V to 10 (m/min), respectively. High-quality welding can be continuously performed in this manner. The size of the opening 18a of the abutting portion 18 of the metal pipe 1b will slightly vary depending on the extra length control conditions (to be described separately) and setting of the positioning section 71 (FIGS. 23A and 23B). When the positioning section 71 is set as shown in FIG. 23A, the size of the opening 18a is increased; when the positioning section 71 is set as shown in FIG. 23B, the size of the opening 18a is decreased.

To perform high-quality welding continuously, the welding conditions, e.g., the welding rate, the irradiation power intensity of the laser beam, the focus shift amount, and the like must be selected, as described above. An optimum opening (opening for welding) 18a changes depending on the preset welding conditions. Therefore, the opening 18a of the abutting portion 18 of the metal pipe 1b is adjusted by the opening width adjusting section 100 to an optimum value, and the metal pipe 1a is fed to the welding section. Adjustment of the opening width has already been described, and a detailed description thereof will be omitted here.

(4) Measuring and Diameter Reducing Step

The metal pipe 1c, which is sealed as its opening 18a and welded, is fed to the measuring section 8. In the measuring section 8, the passing speed, i.e., the welding rate V of the metal pipe 1c is measured by the speedometer 83 while the metal pipe 1c is supported by the support roll stand 82. The welding state is examined by the spiral flaw detector 81.

After passing the spiral flaw detector 81, the metal pipe 1c is diameter-reduced to a predetermined size by the diameter reducing means 9 in accordance with the outer diameter of the incorporated optical fiber 5. When the metal pipe 1c is to be diameter-reduced by the diameter reducing means 9, as only one introducing tube 61 having a double tube structure is inserted in the metal pipe 1c up to a position immediately before the spiral flaw detector 81, the metal pipe 1c can be easily diameter-reduced to the predetermined size. While the metal pipe 1c is diameter-reduced by the diameter reducing means 9, a tension is applied to the metal pipe 1c mainly by the forming means 2 and the diameter reducing means 9.

(5) Traction Step

Prior to continuous operation of this apparatus, when the metal pipe-covered optical fiber cable 12 is to be taken up by the cable take-up machine 10, the sealed, diameter-reduced metal pipe 1d and the optical fiber 5 must be engaged with each other. For this purpose, before the continuous operation, the welded, sealed metal pipe 1d is manually wound on the capstans 11a and 11b of the tension changing means 11 by a predetermined number of turns and pulled, and the distal end of the metal pipe 1d is mounted on the cable take-up machine 10 through the tension adjusting means 13. In this state,. the distal end of the optical fiber 5 is inserted up to the position before the capstan 11a. The metal pipe 1d is pressed at this position, thereby engaging the optical fiber 5 with the inner side of the metal pipe 1d. Thereafter, the metal pipe 1d is taken up by driving the capstan 11, so that the optical fiber 5 is withdrawn from the introducing tube 61 together with the metal pipe 1d.

During the continuous operation, the metal pipe 1d diameter-reduced by the diameter reducing means 9 passes through the tension changing means 11 and the tension adjusting means 13. The tension adjusting means 13 removes the tension applied to the metal pipe 1d.

(6) Extra Length Control Step

When the metal pipe 1d is wound on the capstans 11a and 11b and pulled, a tension acts on the metal pipe 1d due to the frictional force between the metal pipe 1d and the capstans 11a and 11b. This frictional force is large at the start of winding and is gradually decreased in accordance with an increase in number of turns. Accordingly, the tension is large at the start of winding and is gradually decreased. An elongation corresponding to this tension occurs in the winding portion of the metal pipe 1d.

For example, in an ordinary operation, assume that a stainless steel strip 1 having a width of 4 mm and a thickness of 0.1 mm is formed into a metal pipe 1c having an outer diameter of 1.3 mm, and is drawn into a metal pipe 1d having an outer diameter of 1.0 mm. When the tension of the metal strip 1 is adjusted by the metal strip tension adjusting means 14 such that the tension of the metal pipe 1c on the input side of the capstan 11a becomes about 20 kgf, an elongation of +0.30% occurs in the metal pipe 1d due to the tension of the metal strip. At this time, if the tension of, e.g., an optical fiber 5 having an outer diameter of 250 μm is adjusted by the optical fiber tension adjusting means 15 so that a tension of about 25 gf acts on the optical fiber 5 on the input side of the capstan 11a, an elongation of +0.03% occurs in the optical fiber 5.

Figure 14:
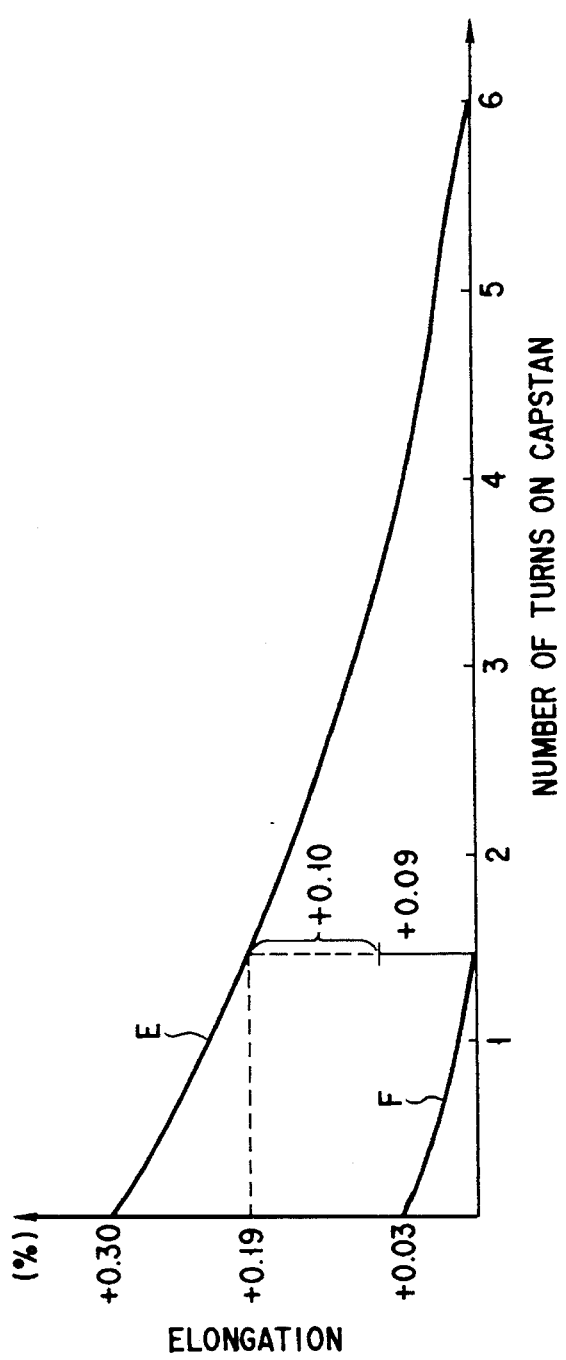
FIGS. 14 to 17 are graphs each showing an extra length control operation.

FIG. 14 shows the result obtained by studying the relationship among the number of turns of the metal pipe 1d on the capstans 11a and 11b, the elongation of the metal pipe 1d, and the elongation of the optical fiber 5. In FIG. 14, the number of turns of the metal pipe 1d on the capstans 11a and 11b is plotted along the axis of abscissa, and the elongation (%) of the metal pipe 1d is plotted along the axis of ordinate. A curve E indicates the change characteristics of the elongation of the metal pipe 1d, and a curve F indicates the change characteristics of the elongation of the optical fiber 5. As indicated by the curve F, when the metal pipe 1d is wound on the capstans 11a and 11b by six turns, the elongation occurring when the metal pipe 1d is supplied to the tension adjusting means 13 becomes very small finally. As indicated by the curve F, when the optical fiber 5 is wound by one and half turns, its elongation becomes almost 0.

In this manner, when the optical fiber 5 is wound by one and half turns so that its elongation becomes 0, the metal pipe 1d has an elongation of 0.19%. Immediately after the metal pipe 1d is wound on the capstans 11a and 11b by six turns, since its tension becomes almost 0, its elongation also becomes almost 0. More specifically, after being wound by six turns, the metal pipe 1d shrinks by 0.19% as compared to the shrinkage obtained after it is wound by one and half turns. The tension of the optical fiber 5 is almost 0 after the optical fiber 5 is wound by one and half turns. Accordingly, no change occurs in elongation of the optical fiber 5 after winding, and thus the length of the optical fiber 5 does not change. Therefore, after the metal pipe 1d is wound by six turns, the optical fiber 5 is longer than the metal pipe 1d by about 0.19%.

The winding diameter of the metal pipe 1d to be wound on the capstans 11a and 11b and the winding diameter of the optical fiber 5 engaging with the inner wall of the metal pipe 1d differ. Thus, when, e.g., the diameter of the capstans 11a and 11b is about 500 mm, the optical fiber 5 has an elongation larger than that of the metal pipe 1d by about +0.09%. This elongation of 0.09% is canceled by 0.19% described above. As a result, the optical fiber 5 becomes longer than the metal pipe 1d by 0.10%.

Figure 15:
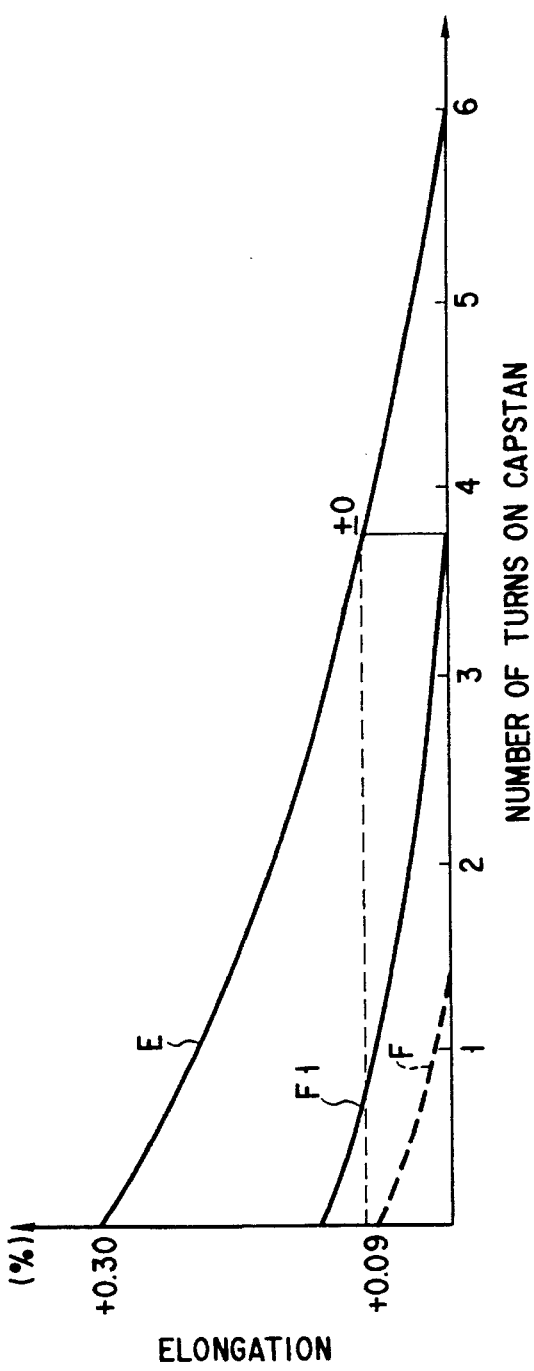

A curve F1 of FIG. 15 shows an example of the change characteristics of the elongation of the optical fiber 5. The curve F1 is obtained when the tension of the optical fiber 5 is changed by the tension adjusting means 15 so that it is increased on the input side of the capstan 11a, while the tension of the metal pipe 1d on the input side of the capstan 11a is kept unchanged as in FIG. 14. The curve F1 indicates that when the optical fiber 5 is wound on the capstans 11a and 11b by 3 and half turns, its tension becomes almost 0. Meanwhile, the elongation of the metal pipe 1d is 0.09% after the metal pipe 1d is wound by 3 and half turns. When the elongation of 0.09% of the metal pipe 1d and the elongation of 0.09% of the optical fiber 5 caused by the difference in winding diameter are canceled with each other, the elongation of the metal pipe 1d and that of the optical fiber 5 become the same, and a difference in length between the metal pipe 1d and the optical fiber 5, that is, the extra length becomes 0%.

Figure 16:
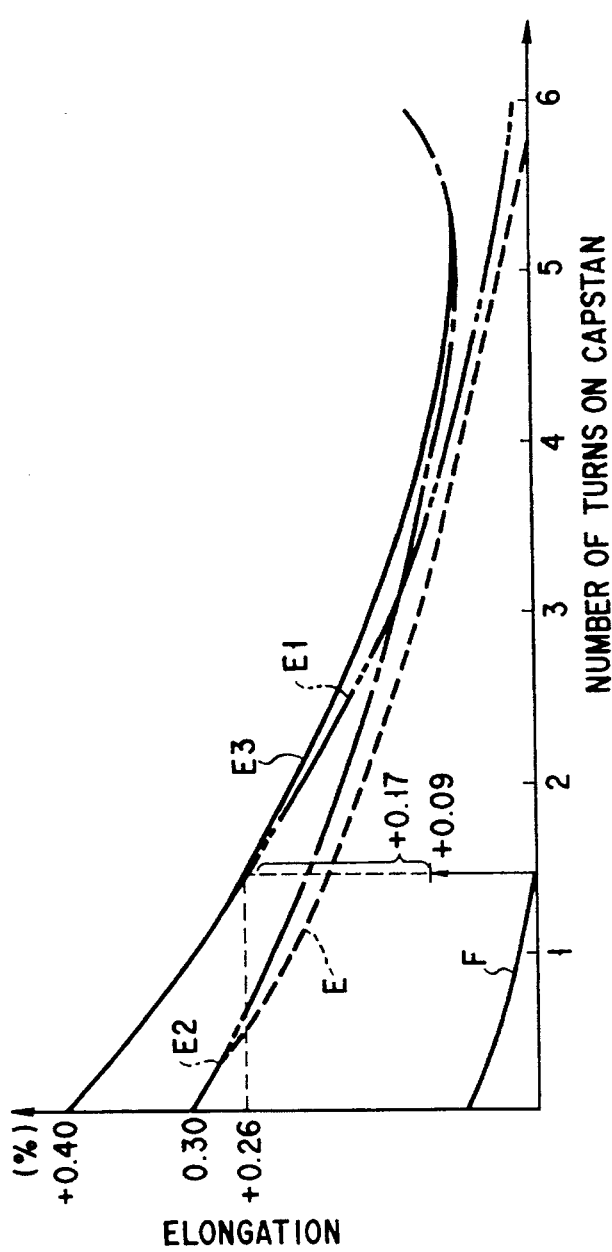

A curve E1 of FIG. 16 shows the change characteristics of the elongation of the metal pipe 1d. The curve E1 is obtained when, as opposed to the case of FIG. 15, the tension of the optical fiber 5 on the input side of the capstan 11a is not changed but the tension is applied to the metal strip 1 by the tension adjusting means 14, thereby increasing the tension on the metal pipe 1d on the input side of the capstan 11a.

A curve E2 of FIG. 16 shows the change characteristics of the elongation of the metal pipe 1d. The curve E2 is obtained when the tension of the metal pipe 1d on the output side of the capstans 11a and 11b is increased by the tension adjusting means 13 while the tension of the metal pipe 1d on the input side of the capstan 11a is the same as that of the case of FIG. 14. A curve E3 of FIG. 16 shows the change characteristics of the elongation of the metal pipe 1d obtained when the tension of the metal pipe 1d is increased both on the input and output sides of the capstans 11a and 11b.

In this manner, when the tension of the metal pipe 1d on one or both of the input and output sides of the capstans 11a and 11b are increased by a predetermined value, the length of the optical fiber 5 can be increased to be larger than that of the metal pipe 1d by a desired amount. For example, in the case indicated by the curve E3, when the metal pipe 1d is wound on the capstans 11a and 11b by one and half turns, its elongation is +0.26%. Thus, the optical fiber 5 can be increased to be larger than the metal pipe 1d by 0.17% on the output side of the capstans even if the elongation of 0.09% caused by the winding diameter of the optical fiber 5 is canceled.

Figure 17:
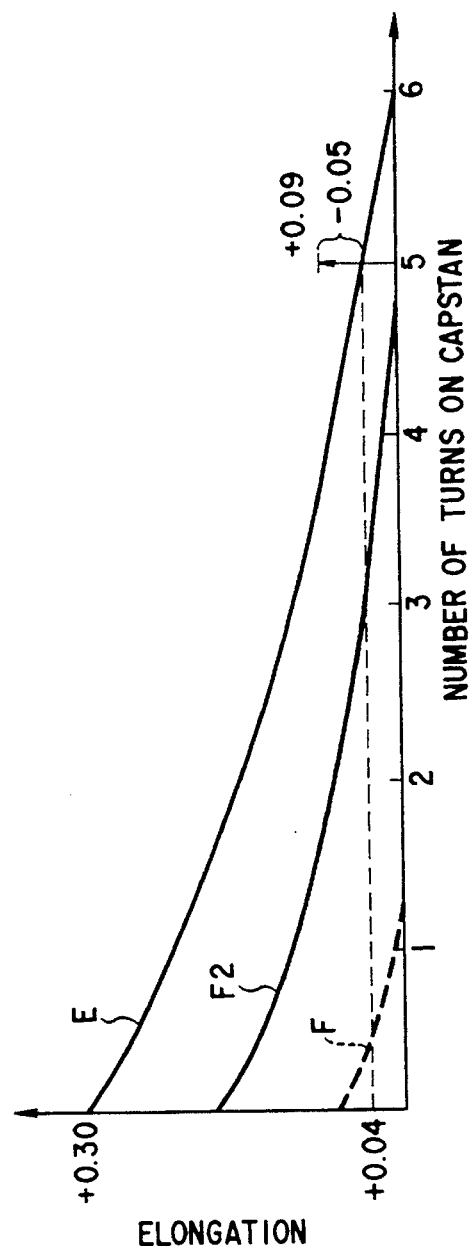

A curve F2 of FIG. 17 shows the change characteristics of the elongation of the optical fiber 5 obtained by further increasing the tension of the optical fiber 5 on the capstan input side than in the case shown in FIG. 15. The curve F2 indicates that the optical fiber 5 can be made shorter than the metal pipe 1d. In this case, the elongation of the optical fiber 5 becomes 0 when it is wound by 5 turns, and the elongation of the metal pipe 1d obtained at this time is +0.04%. This elongation of +0.04% is canceled by the winding difference of 0.09% of the optical fiber 5. As a result, the optical fiber 5 can be made shorter than the metal pipe 1d by 0.05%.

As described above, when the capstans 11a and 11b on which the metal pipe 1d is wound by a plurality of turns, the tension adjusting means 14 for the metal strip 1, the tension adjusting means 15 for the optical fiber 5, and in some cases the tension adjusting means 13 on the output side of the capstans 11a and 11b are totally adjusted, so that the length of the optical fiber 5 with respect to the metal pipe 1d can be arbitrarily adjusted. When the tension of the metal pipes 1c and 1d is adjusted by adjusting the positioning section 71 in the same manner as in adjusting the tension adjusting means 14 for the metal strip 1, extra length control can be performed at a higher precision. The function of the positioning section 71 in extra length control in this case is identical to that of the extra length control function of the tension adjusting means 14 for the metal strip 1, and thus a detailed description thereof will be omitted.

In the above example, extra length control for the metal pipe 1d having an outer diameter of 1.08 mm and a thickness of 0.1 mm and the optical fiber 5 having an outer diameter of 250 μm is described. Table 1 shows the elongation (%) of the metal pipe 1d and the elongation (%) of the optical fiber 5 on the input side of the capstans 11 which are obtained when the extra length is set to 0% by changing the outer diameter and thickness of the metal pipe 1d and the outer diameter of the optical fiber 5.

TABLE 1

| Outer Diameter/ Thickness of Metal Pipe | Diameter of Fiber (mm) | Elongation in Metal Pipe | Elongation in Fiber | Difference in Circumferential Length (%) |
| --- | --- | --- | --- | --- |
| 2.4/0.2 | 1.6 | 0.24 | 0.10 | 0.07 |
| 1.7/0.15 | 0.25 | 0.26 | 0.07 | 0.15 |
| 0.7/0.1 | 0.25 | 0.35 | 0.20 | 0.05 |

Table 1 indicates that extra length control can be performed with a predetermined extra length rate even by using a metal pipe 1d and an optical fiber 5 having arbitrary sizes.

However, since the optical fiber is made of glass, when a large tension is applied to the optical fiber to increase the length of the optical fiber, a small crack is formed due to the residual strain (stress) occurring in the optical fiber. Then, the optical fiber may be damaged to prolong its service life. Hence, when the optical fiber is used under severe conditions so that the manufacturing specifications require strictness, for example, when the optical fiber is used as an underseas cable, extra length control must be performed by minimizing a tension to the optical fiber. In this case, the metal pipe 1d from which a tension is removed is diameter-reduced by the metal pipe length adjusting means 130 shown in FIGS. 1 and 24, thereby adjusting its length, and extra length control is performed without applying a substantial or large tension to the optical fiber. When extra length control is performed by the metal pipe length adjusting means 130, the length of the optical fiber with respect to the metal pipe, i.e., the extra length, can be adjusted without elongating the optical fiber. As a result, damage to the optical fiber can be avoided, and the service life of the optical fiber can be prolonged.

Especially, when a filler is charged into the metal pipe from the introducing tube 61, the optical fiber 5 which is introduced together with the filler receives a tension due to the variations in change in viscosity resistance of the filler. When the optical fiber is introduced from the inner tube 61a of the introducing tube 61 and the filler is introduced from the outer tube 61b, thus providing a double tube structure as in the embodiment, the optical fiber will not receive any tension caused by the viscosity resistance of the filler when charging the filler. Therefore, damage to the optical fiber can be reliably prevented by the combination of the metal pipe length adjusting means 130 and the introducing tube 61 having the double tube structure.

Table 2 shows an example in which the length of the metal pipe is adjusted (extra-length controlled) by the metal pipe length adjusting means 130. From Table 2, arbitrary extra length adjustment can be apparently performed in accordance with the product specifications.

TABLE 2

| Outer Diameter/ Thickness of Pipe Element (mm) | Outer Diameter/ Thickness of Product (mm) | No Extra Length Adjustment % | Product Specifications with Extra Length Adjustment % | Amount of Extra Length Adjustment % |
| --- | --- | --- | --- | --- |
| 3 6/0.2 | 2.8/0.2 | +0.2 | 0 | −0.2 |
| 2.4/0.15 | 1.7/0.15 | +0.3 | −0.1 | −0.4 |
| 1.4/0.1 | 0.9/0.1 | +0.4 | +0.15 | −0.25 |

(7) Take-up Step

The metal pipe-covered optical fiber cable 12 obtained by extra length control is taken up by the cable take-up machine 10.

As has been described above, according to the apparatus and method of the present invention, the length of the metal pipe is adjusted by diameter reduction of the metal pipe from which a tension is removed, thereby performing extra length control of the metal pipe with respect to the optical fiber. Thus, any tension need not be applied to the optical fiber for the purpose of extra length control. Therefore, an excessive tension is not applied to the optical fiber, or substantially no tension need be applied to the optical fiber, so that cracking can be prevented, thereby prolonging the service life of the optical fiber.

In the above embodiment, the optical fiber introducing means 6 is provided between the first and second assembling bodies 3 and 4 of the forming means 2. However, as shown in FIG. 18, an optical fiber introducing means 6 may be provided before the first assembling body 3, and an introducing tube 61 may be inserted before a forming roller pair 31a of the initial stage.

In the above embodiment, the half split type squeeze shoes 102 and 104 are provided to adjust the width of the opening 18a of the metal pipe. However, the present invention is not limited to this, and the squeeze shoe may be divided into three or more parts. In the embodiment, the split type squeeze shoes 102 and 104 are arranged vertically. However, the present invention is not limited to this, and split type shoes may be provided horizontally. Also, a layer having a small friction coefficient may be formed on the inner circumferential surface of each squeeze shoe.

Furthermore, in the above embodiment, the traction means comprising the capstans 11a and 11b of the tension changing means 11 and the tension adjusting means 13 is directly provided after the diameter reducing means 9, and the tension of the metal pipe 1d on the input and output sides of the capstans 11a and 11b and the tension of the optical fiber 5 on the capstan input side are adjusted by the capstans 11a and 11b and the tension adjusting means 14, 15, and 13 while pulling the metal pipe-covered optical fiber cable 12, thereby performing extra length control. However, as shown in FIG. 19, a means 19 for pulling the metal pipe 1d may be provided before capstans 11a and 11b, so that the tension of the metal pipe 1d on the capstan input side can be arbitrarily changed. As the pulling means 19, for example, infinite track type capstans may be used, and the metal pipe 1d may be pulled as it is sandwiched by the capstans, so that the metal pipe 1d can be pulled with a tension required in the forming schedule. The tension of the metal pipe 1d to be supplied to the capstan 11a can be arbitrarily controlled by adjusting the feed speed of the infinite track type capstans.

After the optical fiber 5 is manufactured, if the optical fiber 5 is subjected to secondary forming in a later step, the extra length may become sometimes different from the target value, so that extra length control must be performed. In this case, extra length control may be performed while considering the difference in extra length value, thereby obtaining an optical fiber having an appropriate extra length after secondary forming.

In the above embodiments, one optical fiber is introduced in a metal pipe. However, an optical fiber bundle comprising a plurality of optical fibers can be introduced in the same manner.

The welding means is not limited to the laser welding means, but other welding means, e.g., a TIG welding means, a plasma welding means, and the like, may be used, as a matter of course.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An apparatus for manufacturing an optical fiber cable covered with a metal pipe, comprising:

forming means for forming a metal strip into a metal pipe by abutting two sides of the metal strip;

welding means for forming a sealed metal pipe by welding the abutted two sides of the metal strip;

optical fiber introducing means for introducing an optical fiber or an optical fiber bundle into the sealed metal pipe;

diameter reducing means for reducing a diameter of the sealed metal pipe by applying a tension to the sealed metal pipe;

traction means, arranged downstream of said diameter reducing means, for pulling the metal pipe; and metal pipe length adjusting means, arranged downstream of said traction means, for controlling a difference in length between the optical fiber or the optical fiber bundle and the metal pipe by diameter-reducing the metal pipe.

2. An apparatus according to claim 1, wherein said metal pipe length adjusting means comprises:

a pair of rollers arranged to pass the metal tube therebetween;

urging means for urging at least one of said rollers toward the other of said rollers while the metal pipe is present between said pair of rollers; and urging force adjusting means for adjusting an urging force of said urging means.

3. An apparatus for manufacturing an optical fiber cable covered with a metal pipe, comprising:

forming means for forming a metal strip into a metal pipe by abutting two sides of the metal strip;

welding means for forming a sealed metal pipe by welding the abutted two sides of the metal strip;

optical fiber protecting means, provided in the metal pipe and extending therethrough to at least a welding position of said welding means, for protecting an optical fiber or an optical fiber bundle from welding heat generated by said welding means, said optical fiber protecting means having a multiple substantially coaxial tube structure including at least an inner tube and an outer tube;

optical fiber introducing means for introducing the optical fiber or the optical fiber bundle into the sealed metal pipe through said inner tube of said optical fiber protecting means;

filler supplying means for supplying a filler into the metal pipe through said outer tube of said optical fiber protecting means;

diameter reducing means for reducing a diameter of the sealed metal pipe by applying a tension to the sealed metal pipe;

traction means, arranged downstream of said diameter reducing means, for pulling the metal pipe; and metal pipe length adjusting means, arranged downstream of said traction means, for controlling a difference in length between the optical fiber or the optical fiber bundle and the metal pipe by diameter-reducing the metal pipe.

4. An apparatus according to claim 3, further comprising inert gas supplying means for supplying an inert gas into the metal pipe through said inner tube of said optical fiber protecting means.

5. An apparatus according to claim 3, further comprising connector means, mounted at a proximal end of said optical fiber protecting means, for connecting said filler supplying means with said outer tube of said optical fiber protecting means.

6. An apparatus according to claim 4, further comprising connector means, mounted at a proximal end of said optical fiber protecting means, for connecting said inert gas supplying means with said inner tube of said optical fiber protecting means, and for connecting said filler supplying means with said outer tube of said optical fiber protecting means.

7. An apparatus according to claim 1, wherein the length between the optical fiber or the optical fiber bundle and the metal pipe is controlled by applying a tension to the metal pipe.

8. An apparatus according to claim 1, wherein the length between the optical fiber or the optical fiber bundle and the metal pipe is controlled by applying a tension to the metal pipe and further controlled by applying a minimal tension to the optical fiber or the optical fiber bundle.

9. A method of manufacturing an optical fiber cable covered with a metal pipe, comprising the steps of:

forming a metal strip into a metal pipe by abutting two sides of the metal strip;

welding the abutted two sides of the metal strip to form a sealed metal pipe;

introducing an optical fiber or an optical fiber bundle into the sealed metal pipe;

reducing a diameter of the sealed metal pipe by applying a tension to the sealed metal pipe;

pulling the diameter-reduced metal pipe by a traction device; and adjusting the length of the pulled diameter-reduced metal pipe by controlling a difference in length between the optical fiber or the optical fiber bundle and the metal pipe by diameter-reducing the metal pipe.

10. A method according to claim 9, wherein the metal pipe length adjusting step comprises:

passing the metal pipe between a pair of rollers;

urging at least one of said rollers toward the other of said rollers while the metal pipe is present between said pair of rollers; and adjusting an urging force of at least one of said rollers toward the other of said rollers.

11. A method of manufacturing an optical fiber cable covered with a metal pipe, comprising the steps of:

forming a metal strip into a metal pipe by abutting two sides of the metal strip;

welding the abutted two sides of the metal strip to form a sealed metal pipe;

providing an optical fiber protecting means in the metal pipe to extend therethrough to at least a welding position at which the metal pipe is welded, the optical fiber protecting means having a multiple substantially coaxial tube structure including at least an inner tube and an outer tube;

introducing an optical fiber or an optical fiber bundle into the sealed metal pipe through said inner tube of said optical fiber protecting means;

supplying a filler into the metal pipe through said outer tube of said optical fiber protecting means;

reducing a diameter of the sealed metal pipe by applying a tension to the sealed metal pipe;

pulling the diameter-reduced metal pipe by a traction device; and adjusting the length of the pulled diameter-reduced metal pipe by controlling a difference in length between the optical fiber or the optical fiber bundle and the metal pipe by diameter-reducing the metal pipe.

12. A method according to claim 11, further comprising the step of supplying an inert gas into the metal pipe through said inner tube of said optical fiber protecting means.

13. A method according to claim 9, wherein the difference in length between the optical fiber or the optical fiber bundle and the metal pipe is controlled by applying a tension to the metal pipe.

14. A method according to claim 9, wherein the difference in length between the optical fiber or the optical fiber bundle and the metal pipe is controlled by applying tension to the metal pipe and further controlled by applying a minimal tension to the optical fiber or the optical fiber bundle.

* * * * *